(12) United States Patent
Kanan et al.

(10) Patent No.: US 11,804,719 B1
(45) Date of Patent: Oct. 31, 2023

(54) COORDINATING STATION-USE POWER ACROSS NETWORKED PLANTS

(71) Applicant: 8ME NOVA, LLC, El Dorado Hills, CA (US)

(72) Inventors: Nadim Kanan, Elk Grove, CA (US); Zeljko Gigio Sakota, Walnut, CA (US)

(73) Assignee: 8ME NOVA, LLC, El Dorado Hills, CA (US)

( * ) Notice: Subject to any disclaimer, the term of this patent is extended or adjusted under 35 U.S.C. 154(b) by 0 days.

(21) Appl. No.: 18/126,716

(22) Filed: Mar. 27, 2023

(51) Int. Cl.
*H02J 3/46* (2006.01)
*H02J 3/38* (2006.01)

(52) U.S. Cl.
CPC ............. *H02J 3/466* (2020.01); *H02J 3/381* (2013.01); *H02J 2300/24* (2020.01); *H02J 2300/28* (2020.01)

(58) Field of Classification Search
CPC ........ H02J 3/466; H02J 3/381; H02J 2300/24; H02J 2300/28
See application file for complete search history.

(56) References Cited

U.S. PATENT DOCUMENTS

| | | | |
|---|---|---|---|
| 2010/0245103 A1* | 9/2010 | Plaisted | H02S 40/44 340/657 |
| 2012/0029720 A1* | 2/2012 | Cherian | H02J 13/00 700/297 |
| 2014/0018969 A1* | 1/2014 | Forbes, Jr. | H02J 13/00 700/295 |
| 2017/0077701 A1* | 3/2017 | Meier | H02J 13/00001 |
| 2019/0369572 A1* | 12/2019 | Watanabe | G05B 13/048 |
| 2020/0112174 A1* | 4/2020 | Clifton | H02J 7/0068 |
| 2021/0242686 A1* | 8/2021 | Petersen | H02J 3/381 |
| 2022/0121260 A1* | 4/2022 | King | G06F 1/28 |

* cited by examiner

*Primary Examiner* — Ziaul Karim
(74) *Attorney, Agent, or Firm* — Foley & Lardner LLP

(57) ABSTRACT

A non-transitory computer readable storage medium in an energy control system includes instructions stored thereon that, upon execution by a processor, cause the processor to receive a request for station power from a requesting power plant of a plurality of power plants, determine a burden score associated with supplying the station power to the requesting power plant from two or more supplier power plants of the plurality of power plants, allocate available power from the supplier power plant having the lowest burden score to the requesting power plant, and provide a notification to an operator of the supplier power plant having the lowest burden score. The notification indicating the amount of power expected to be supplied to the requesting power plant.

19 Claims, 11 Drawing Sheets

COORDINATING STATION-USE POWER ACROSS NETWORKED PLANTS

BACKGROUND

Power plants, including fossil fuel power plants and renewable energy power plants, may themselves consume power to ensure that essential equipment, including plant controls and thermal controls can operate. Most fossil fuel power plants are able to supply their own station power from the energy generated onsite. Renewable energy power plants (REPPs), which may include one or more renewable energy sources (RES), such as photovoltaic (PV) panels and wind turbines, are unable to supply their own station power during nighttime, due to weather conditions, or due to the lack of or discharged onsite battery energy storage systems (BESS). For example, PV panels may not produce sufficient power at night, and wind turbines may not produce sufficient power during the day or on windless days. When power plants are unable to supply their own station power, they may need to draw station power from the grid, which may be costly and inefficient. An operator of a network of multiple power plants may be able to transmit power from one power plant to another, via the grid, at a lower cost and higher efficiency. The operator of such a network of power plant may desire to maximize the efficiency of transmitting power between power plants when more than one power plant requires station power or is able to supply required station power.

DETAILED DESCRIPTION

Figure 1A:
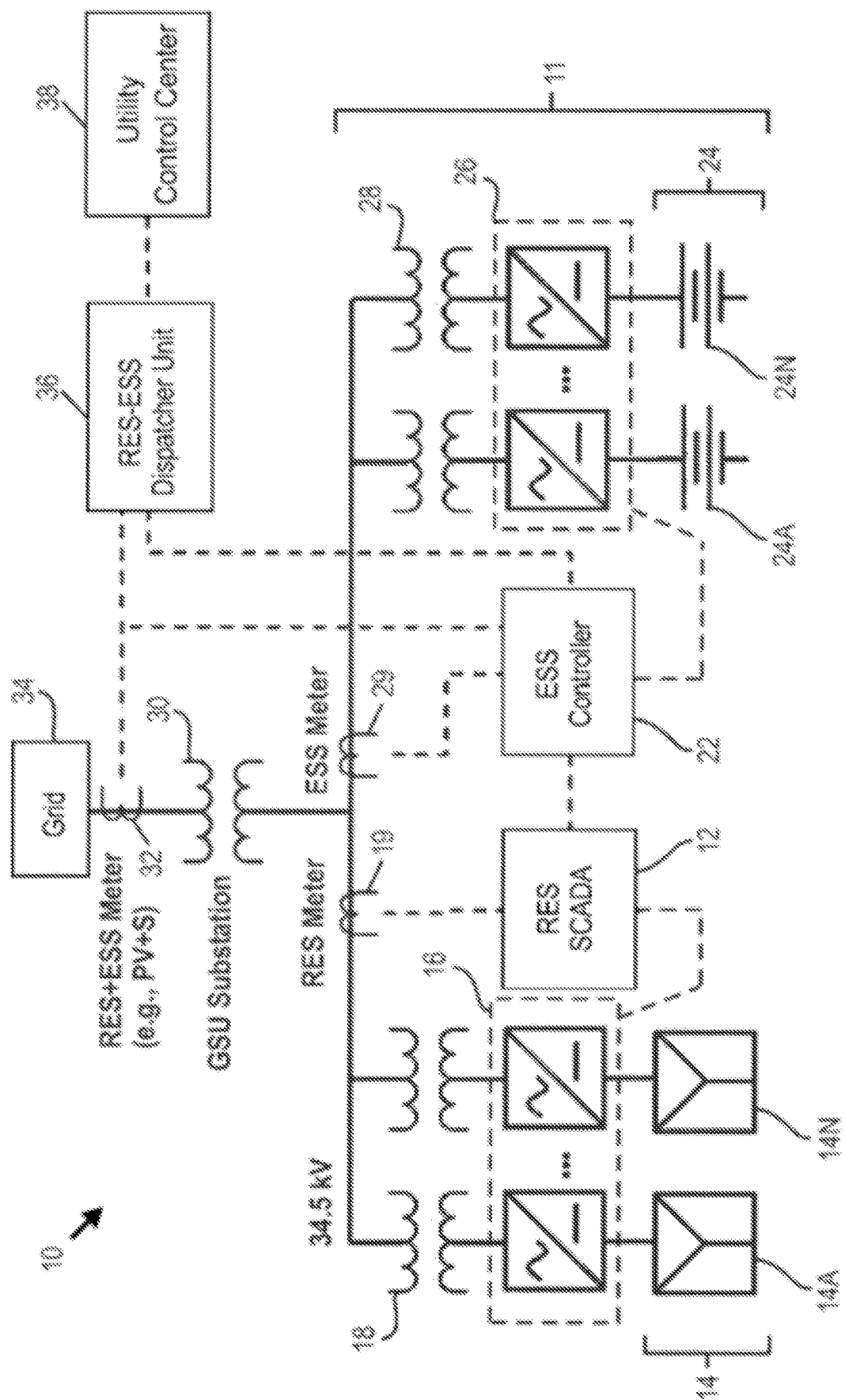
FIG. 1A is a schematic diagram of a renewable electrical energy generation device, according to some embodiments.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, in the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Power plants, including fossil fuel power plants and renewable energy power plants, may consume power to ensure that essential equipment, including transformers, inverters, plant controls, and thermal controls, can operate. Offices and other infrastructure onsite at the plant may also require power for heating, ventilation, air conditioning, lights, computers, servers, and other office equipment. The power required to operate the power plant is referred to as "station power." While the plant is operating, and the energy demands of the plant's customer allow, the station power can be supplied by the power plant itself. That is, if the energy generated by the power plant minus the energy supplied to grid customers exceeds the station power, the power plant may supply its own station power. However, when the power plant equipment does not generate sufficient power to supply its own station power, the power plant may have to take power from the grid. For example, a solar power plant may take its station power from the grid at night, when the solar power plant is not generating power. Taking power from the grid may be inefficient and may result in fossil fuel power being used to power renewable energy power plants, which may be undesirable for the owner or customers of the renewable energy plant.

An operator of multiple power plants can sometimes use energy generated at a first power plant to supply the station power for a second power plant via the grid. For example, an operator of multiple solar power plants without BESS may supply power from a first power plant in a sunny area to a second power plant in a cloudy area for a given time period. As the weather changes and clouds shift, power generated by second power plant may supply the station power for the first power plant. This transfer of power between energy generation sites may be referred to as "wheeling power." Operators may prefer to "wheel power" between the power plants that they operate over taking energy off the grid from an unknown source. When an operator operates several power plants, it may be more efficient to wheel power from a first plant to a second plant than from a third plant to the second plant. When multiple plants require station power from an outside source, one plant may need station power more than another. And in some circumstances, it may be impossible to wheel power from one plant to another due to grid congestion, wherein the grid is already operating at capacity and cannot carry the wheeled power between plants. Accordingly, a solution is needed for determining the most efficient way for an operator of multiple power plants to wheel power between plants to supply station power to such power plants.

The systems and methods discussed herein may allow power to be transmitted, via a power grid, from provider power plants with available power to requesting power plants that cannot meet their own station power needs. When multiple provider power plants have available power, the systems may allocate power to the requesting power plants from the provider power plants that will be the least burdened by supplying the power. A burden score for each provider power plant may be determined and compared to determine which power plants will supply the requesting power plants with station power. Power may be allocated from the provider power plant having the lowest burden score before power is allocated from other power plants. When multiple requesting power plants require station power, the systems may allocate power from the provider power plants to the requesting power plants based on the relative need of the requesting power plants. A need score for each requesting power plant may be determined and compared to determine which power plants will receive station power from the provider power plants. Power may be allocated to the requesting power plant having the highest need score before power is allocated to other power plants.

The systems and methods may take into account constraints from the grid to determine whether one power plant is precluded from providing power to another power plant. If grid transmission lines between two power plants are already at capacity, power may not be able to be transmitted between the two power plants. The systems and methods discussed herein may include notifying the operators of the provider power plants and the operators of the requesting power plants of the power that has been allocated therefrom or thereto. Further, the systems and methods discussed herein may include operating equipment of the power plants to supply the power from one or more provider power plants to one or more requesting power plants. The actual power supplied or delivered may be measured by a meter associated with at least one of the requesting power plants or the provider power plants. The operators of the provider power plants and the operators of the requesting power plants may be notified of the measurements. Burden scores may be calculated based on operational disruption to the supplier power plant expected from supplying station power to the requesting power plant, power transmission losses expected from transmitting power from the supplier power plant to the requesting power plant, and other efficiency losses expected from supplying station power to the requesting power plant. Need scores may be calculated based on operational disruption to the requesting power plant expected if station power is not provided, efficiency losses expected from receiving station power from an alternate source, and other efficiency losses expected from a temporary loss of station power.

The systems and methods discussed herein may include allocating power to one or more requesting power plants from a cooperative power plant (CPP) when the requesting power plants are unable to supply their own station power. Power from the CPP may be allocated based on the relative need of each requesting power plant. Need scores for each requesting power plant may be calculated and used to quantify and compare relative need, and power may be supplied to the requesting power plants with the highest need scores. A notification may be provided to the operator of the CPP and to the operator of each requesting power plant to which power is allocated indicating the amount of power that will be supplied or received. Further, the systems and methods discussed herein may include operating equipment of the CPP to supply the power to one or more requesting power plants. The actual power supplied or delivered may be measured by a meter associated with at least one of the requesting power plants or the CPP. The operators of the CPP and the operators of the requesting power plants may be notified of the measurements.

The systems and methods discussed herein may include allocating power to one or more requesting power plants from a cooperative network of power plants (CNPP) when the requesting power plants are unable to supply their own station power. Power from the power plants in the CNPP may be allocated to the requesting power plants based on the relative burden on the CNPP power plants and the relative need of the requesting power plants. Power from the lowest burden CNPP power plants may be allocated to the highest need requesting power plants until all of the power requests are met or all of the available power from the CNPP is allocated. In some cases, where the burden on a CNPP power plant to provide station power outweighs the need of a requesting power plant for station power, power may not be allocated to the requesting power plant.

The systems and methods discussed herein may enable efficient transmission of power from power plants with available excess power to power plants unable to supply their own station power. The systems and methods ensure that the requesting power plants with the highest level of need are allocated power before those with lower levels of need, and that the provider power plants that will be least burdened supply power to meet the requests before supplier power plants that will be more burdened. The systems and methods further ensure that power is not provided to a requesting power plant when the burden on a provider power plant exceeds the needs of the requesting power plant. The systems and methods provide notifications to the provider and requesting power plants indicating the power allocated or supplied so that the flow of power can be traced across the power grid.

Referring now to FIG. 1A, a schematic diagram showing interconnections between various components of an AC coupled metering and control system 10 for controlling a renewable electrical energy generation device 14 (e.g., a REPP) including multiple generation units 14A-14N (such as a photovoltaic (PV) array including photovoltaic units) and an energy storage device 24 including multiple energy storage units 24A-24N (such as a battery array including battery units) chargeable with electric power produced by the renewable electrical energy generation device 14 in a renewable energy source/energy storage system (RES-ESS) facility 11 is shown, according to one embodiment. It should be understood that the REPP 14 may include any number of generation units 14A-14N and any number of energy storage units 24A-24N, and the number of generation units 14A-14N may not be the same as the number of energy storage units 24A-24N. The RES-ESS facility 11 may combine a renewable electrical energy generation device 14 (e.g., such as an array of PV panels, wind turbines, or the like), and an energy storage device 24 (e.g., an array of lithium-based batteries) that may be coupled to a single substation 30 and/or located in a single property, area, or structure.

FIG. 1A illustrates an RES-ESS facility 11 that uses inverters 16, 26 to convert direct current (DC) power produced by a renewable electrical energy generation device 14 (e.g., a PV array in certain embodiments) or power released by the energy storage device 24 to alternating current (AC) power for coupling to an AC electrical grid 34. In certain embodiments, the RES-ESS facility 11 may embody a DC coupled RES-ESS facility. In certain embodiments, an energy storage device 24 may include at least one of (or a combination of) energy storage units 24A, 24B using various constructions and chemistries, capacitors, or mechanical energy storage devices such as flywheels or pumped-hydro installations. In certain embodiments, an energy storage device 24 may include at least one electrolysis unit (e.g., configured to electrolyze water to release hydrogen) and a hydrogen storage unit (e.g., hydrogen storage vessels, adsorbent media for releasably binding hydrogen, and/or reversible chemical reactant vessels or beds). In certain embodiments, an energy storage device 24 may include electrical charge storage devices such as batteries, optionally augmented with capacitors.

In certain embodiments, a RES-ESS dispatcher unit 36 can control the charge or discharge of the energy storage device 24 (e.g., batteries) by communicating with an ESS controller 22. The ESS controller may be located in the RES-ESS facility 11. A RES SCADA (supervisory control and data acquisition) controller 12 may be operatively coupled with RES inverters 16 associated with the renewable electrical energy generation device 14 (optionally embodied in a PV array), and the ESS controller 22 may be operatively coupled with ESS inverters 26 associated with the energy storage device 24. Both the RES SCADA controller 12 and the ESS controller 22 may be in communication with the RES-ESS dispatcher unit 36. In certain embodiments, a utility control center 38 (e.g., of an electric power utility or grid operator) may communicate with the RES-ESS dispatcher unit 36 using Distributed Network Protocol 3 (DNP3) and set different configuration options. Additionally, the RES-ESS dispatcher unit 36 may receive or generate an accurate renewable generation forecast (e.g., solar generation forecast). Additionally, the RES-ESS dispatcher unit 36 may receive or generate an accurate forecast of station power requirements for the RES-ESS facility 11.

As shown in FIG. 1A, certain embodiments may utilize readily available electric power meters, such as a RES+ESS electrical power meter 32 to measure RES-ESS (e.g., PV+S) facility output, a RES electrical power meter 19 to measure RES output, and an ESS electrical power meter 29 to measure ESS output. Signals from the RES electrical power meter 19 are provided to the RES SCADA controller 12, and signals from the ESS electrical power meter 29 are provided to the ESS controller 22. The electric power generated by the RES-ESS facility 11 may be provided to an electric power system (e.g., an AC electrical grid 34) via a generator step-up (GSU) substation 30 that implements protection and appropriate voltage conversion. RES transformers 18 and ESS transformers 28 may be arranged between the inverters 16, 26, respectively, and the GSU substation 30 to provide voltage conversion utility (e.g., to supply AC power signals to the GSU substation 30 at 34.5 kV in certain implementations).

Figure 1B:
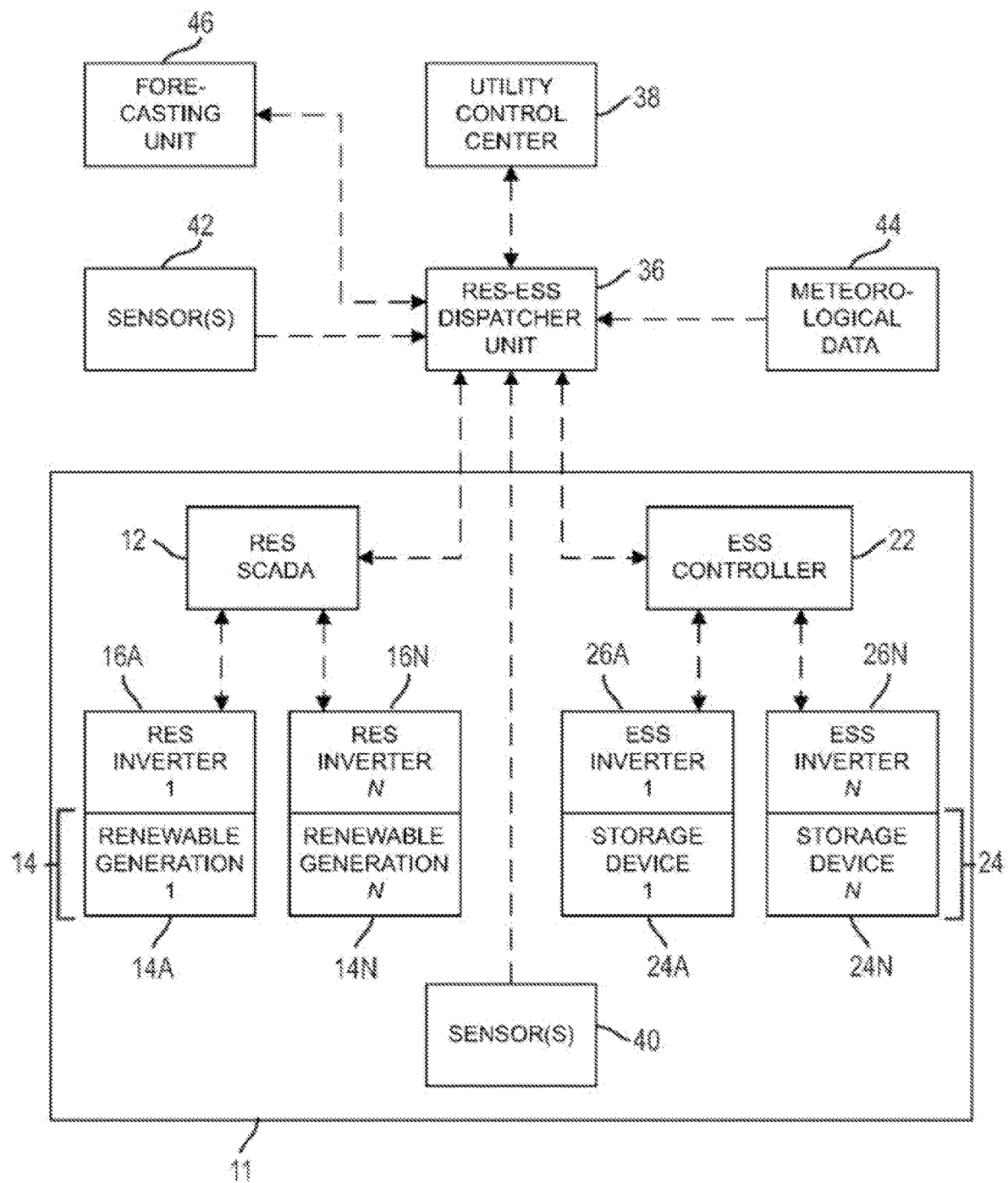
FIG. 1B is a schematic diagram showing certain components of the renewable energy source and energy storage system of FIG. 1A, according to some embodiments.

Referring now to FIG. 1B, a schematic diagram showing certain components of the AC coupled metering and control system of FIG. 1A, including interconnection of control- and sensor-related components is shown, according to one embodiment. As shown in FIG. 1B, the RES-ESS dispatcher unit 36 may be arranged between a utility control center 38 and a RES-ESS facility 11. Within the RES-ESS facility 11, a RES SCADA controller 12 may be operatively coupled with RES inverters 16A-16N (wherein N represents any suitable number) that are configured to provide AC conversion of DC power produced by renewable electrical energy generation units 14A-14N (e.g., arrangeable as parts of a renewable electrical energy generation device 14). It should be understood that the REPP 14 may include any number of generation units 14A-14N and any number of inverter 16A-16N, and the number of generation units 14A-14N may not be the same as the number of inverters 16A-16N. Similarly, within the RES-ESS facility 11, an ESS controller 22 may be operatively coupled with ESS inverters 26A-26N that are configured to provide AC conversion of DC power supplied by energy storage units 24A-24N (e.g., arrangeable as parts of an energy storage device 24). The RES-ESS facility 11 further includes at least one sensor 40, which may comprise one or more sky imaging sensors useful to determine sky conditions (such as the presence of clouds or lack thereof) proximate to the RES-ESS facility 11, with output signals from the at least one sensor 40 being supplied to the RES-ESS dispatcher unit 36. The RES-ESS dispatcher unit 36 may also receive: (i) signals from one or more sensors 42 (e.g., satellite imaging sensors or the like) not necessarily associated with the RES-ESS facility 11; (ii) meteorological data provided by a meteorological modeling unit 44; (iii) signals from a forecasting unit 46 that may forecast generation by the renewable electrical energy generation device 14 and/or one or more other renewable electrical energy generation devices or units. In certain embodiments, time-dependent forecasting of electrical energy production may be performed by the forecasting unit 46 or may be performed by the RES-ESS dispatcher unit 36. In certain embodiments, a time-dependent forecast of electrical energy production may utilize one, two, or all three of the following: on-site sky imaging provided by the sensor(s) 40, satellite imaging provided by the sensor(s) 42, and meteorological data provided by the meteorological modeling unit 44. In certain embodiments, one or more sensors of other types may be used.

Figure 2:
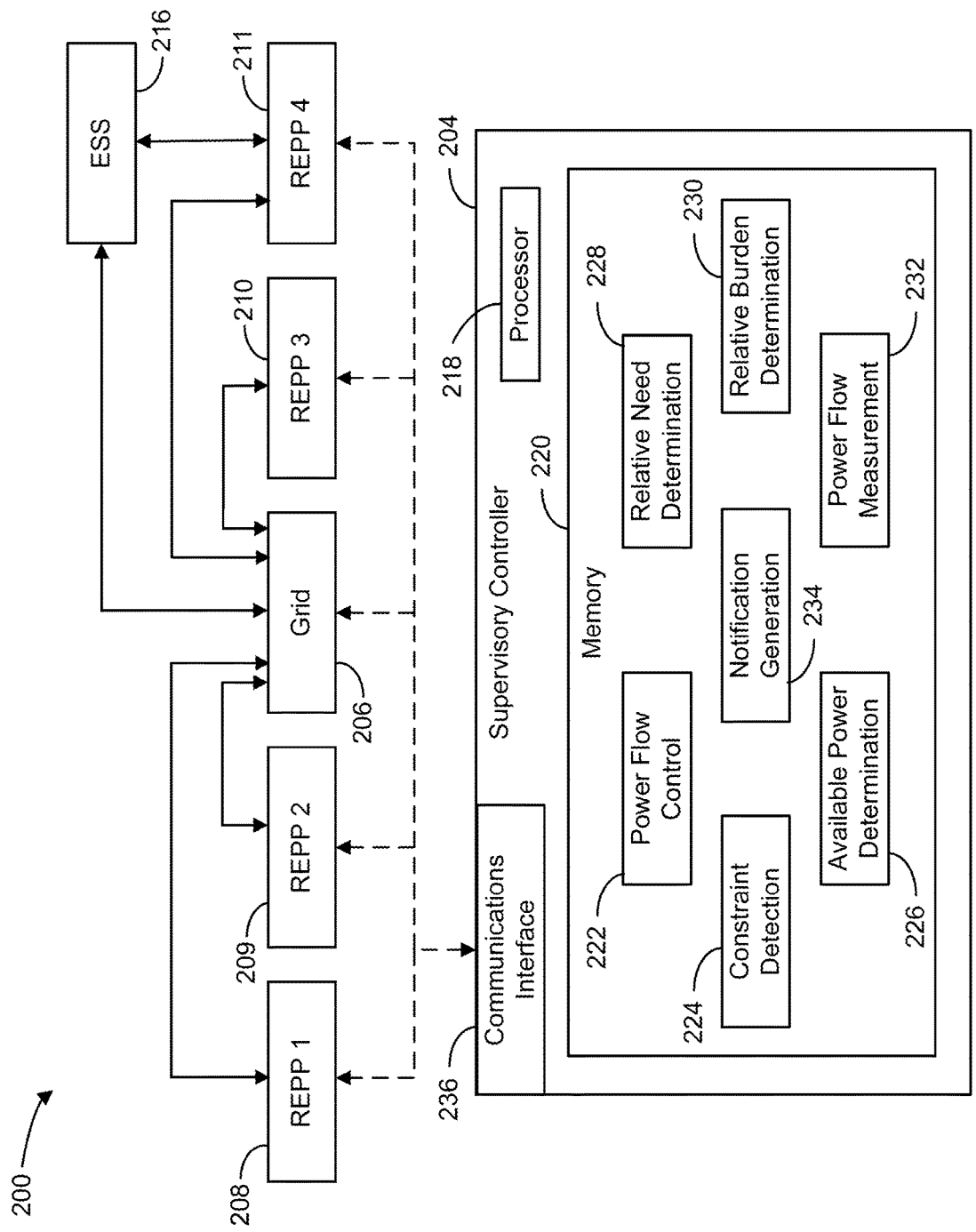
FIG. 2 illustrates a block diagram of an example system for controlling the flow of power between power plants, according to some embodiments.

Referring now to FIG. 2, a system 200 for controlling the flow of power between power plants is shown, in accordance with some embodiments of the present disclosure. In brief overview, the system 200 may include a supervisory controller 204 that communicates with an energy grid 206 (e.g., a utility grid operator controlling the energy grid 206), and several energy generation sources (e.g., power plants) shown as renewable energy power plants (REPP) 208-211, which may each include one or more renewable energy sources (RES) and one or more energy storage systems (ESS). The REPPs 208-211 and the supervisory controller 204 may each be controlled by a single operator or by a collective of operators. The REPPs 208-211 may be electrically coupled to the grid 206, such that the power generated by the REPPs 208-211 may be supplied to the grid. An REPP 208-211 may also take power from the grid to enable plant operations (e.g., station power) when the REPP 208-211 does not generate sufficient power. The controller 204 may control the flow of power into and out of each REPP 208-211. The system 200 may include more, fewer, or different components than shown in FIG. 2. For example, there may be any number of devices or computers that make up or are a part of the controller 204 or networks in the system 200. The system 200 may include additional equipment. For example, the system 200 may include additional REPPs, other non-renewable energy sources (e.g., fossil fuel power plants), more than one grid 206, and additional ESSs coupled to the REPPs and/or non-renewable energy sources.

The controller 204 can include or execute on one or more processors or computing devices and/or communicate via a network. The network can include computer networks such as the Internet, local, wide, metro, or other area networks, intranets, satellite networks, and other communication networks such as voice or data mobile telephone networks. The network can be used to access information resources such as web pages, websites, domain names, or uniform resource locators that can be presented, output, rendered, or displayed on at least one computing device, such as a laptop, desktop, tablet, personal digital assistant, smartphone, portable computers, or speaker.

The controller 204 can include or utilize at least one processing unit or other logic device such as a programmable logic array engine or a module configured to communicate with one another or other resources or databases. The components of the controller 204 can be separate components or a single component. The system 200 and its components can include hardware elements, such as one or more processors, logic devices, or circuits.

The controller 204 may comprise one or more processors 218 that are configured to control the flow of power in the system 200. The controller 204 may comprise a communications interface 236, a processor 218, and/or memory 220. The controller 204 may communicate with the REPPs 208-211 (or devices controlling the REPPs 208-211) and the grid 206 (or devices controlling the grid 206) via the communications interface 236. The processor 218 may be or include an ASIC, one or more FPGAs, a DSP, circuits containing one or more processing components, circuitry for supporting a microprocessor, a group of processing components, or other suitable electronic processing components. In some embodiments, the processor 218 may execute computer code or modules (e.g., executable code, object code, source code, script code, machine code, etc.) stored in the memory 220 to facilitate the activities described herein. The memory 220 may be any volatile or non-volatile computer-readable storage medium capable of storing data or computer code.

The memory 220 may include a power flow control module 222, a constraint detection module 224, an available power determination module 226, a relative need determination module 228, a relative burden determination module 230, a power flow measurement module 232, and/or a notification generation module 234. In brief overview, the components 222-234 may cooperate to control the flow of power between the grid 206 and the REPPs 208-211 based on the energy needed by each REPP 208-211, the energy generated by each REPP 208-211, and the physical limitations of the grid 206, as well as other factors. For example, the controller 204 may determine that the first REPP 208 and the third REPP 210 are each generating excess power, while the second REPP 209 is not generating enough power to supply its own station power. The controller 204 may also determine that the grid 206 has sufficient capacity to supply the excess power from the first REPP 208 to the second REPP 209 and sufficient capacity to supply the excess power from the third REPP 211 to the second REPP 209. Finally, the controller 204 may determine that it is more efficient to supply power from the first REPP 208 to the second REPP 209 than to supply power from the third REPP 210 to the second REPP 209. The controller 204 may then send signals to the first REPP 208 causing power to be delivered from the first REPP 208 to the second REPP 209.

The power flow control module 222 may comprise programmable instructions that, upon execution, cause processor 218 to control the flow of power into and out of each REPP 208-211. For example, the supervisory controller 204 may receive an indication from the first REPP 208 that the first REPP 208 is not producing sufficient power to supply its own station power (e.g., a request for power from the first REPP 208) and may receive an indication from the second REPP 209 that second REPP 209 is producing more power than is required for the grid 206. The power flow control module 222 may direct power from the second REPP 209 to the first REPP 208 to supply the station power for the first REPP 208.

The constraint detection module 224 may comprise programmable instructions that, upon execution, cause processor 218 to receive information regarding constraints on the delivery of power to and from the REPPs 208-211 to and from the grid 206. The constraint detection module 224 may receive information from the REPPs 208-211 as well as the grid 206. For example, the constraint detection module 224 may receive information indicating that the transmission pathway between the first REPP 208 and the second REPP 209 on the grid 206 is at its maximum capacity, such that the grid 206 is unable to carry additional power from the second REPP 209 to the first REPP 208. Thus, the second REPP 209 will be unable to provide the station power for the first REPP 208. In some embodiments, the constraint detection module 224 may receive an indication that the transmission pathway between the first REPP 208 in the second REPP 209 on the grid 206 has less capacity than is needed to supply power to the first REPP 208 from the second REPP 209. This may indicate that the second REPP 209 can supply only a portion of the station power needed by this first REPP 208.

The available power determination module 226 may comprise programmable instructions that, upon execution, cause processor 218 to determine the excess power available (e.g., the available power) from each REPP 208-211. For example, the available power determination module 226 may receive information from the REPPs 208-211 indicating the amount of power being produced by each REPP 208-211. The available power determination module 226 may then subtract from the amount of power being produced by each REPP 208-211 the amount of station power required by each respective REPP 208-211 and the amount of power demanded by the customers of each respective REPP 208-211. For example, the available power determination module 226 may determine that the first REPP 208 is producing 100 kW of power, requires 20 kW of station power, and is required to supply 70 kW of power to its customers. The available power determination module 226 may then subtract the station power and the customer supply power from the power produced to determine that first REPP 208 is producing 10 kW of excess power that can be used to supply the station power to the other REPPs 209-211.

The relative need determination module 228 may comprise programmable instructions that, upon execution, cause processor 218 to receive station power requests from each REPP 208-211. The relative need determination module 228 may then calculate a need score for each power request. The need score may represent the disruption to the respective REPP 208-211 if station power is not supplied and/or the relative cost of taking power from the grid 206 to supply the station power rather than wheeling power from another REPP 208-211. For example, the supervisory controller 204 may receive a request for station power from both first REPP 208 and the second REPP 209. The relative need determination module 228 may determine that startup time for the first REPP 208 is longer than the startup time for the second REPP 209 if station power is disrupted and may assign a higher need score to the first REPP 208 power request than to the second REPP 209 power request. As another example, the relative need determination module 228 may determine that the cost of grid power supplied to the second REPP 209 is higher than the cost of grid power supplied to the first REPP 208 and may assign a higher need score to the second REPP 209 than to the first REPP 208. In some embodiments, multiple factors will be used to determine the need scores of each power request. If all else is equal, the power flow control module 222 may cause power to flow from a REPP 208-211 to the requesting REPP 208-211s with the highest need scores.

The relative burden determination module 230 may comprise programmable instructions that, upon execution, cause processor 218 to determine the burden on each REPP 208-211 to supply the station power to another REPP 208-211 and assign a burden score. The burden score may represent the burden on the provider REPP 208-211 to provide power to the requesting REPP 208-211, for example, due to operational disruption resulting from supplying the power to another REPP 208-211, due to efficiency losses, and/or due to a relative opportunity cost of delivering power to the requesting REPP 208-211 rather than selling the power to the market on the grid 206. For example, after the supervisory controller 204 receives a request for station power from the first REPP 208 and the available power determination module determines that the second REPP 209 and the third REPP 210 each produce sufficient excess power (e.g., available power) to provide at least a portion of the station power for the first REPP 208, the relative burden determination module 230 may determine that the second REPP 209 is farther away from first REPP 208 than the third REPP 210 is from the first REPP 208. The relative burden determination module 230 may determine that the transmission losses due to the distance between the REPPs 208-210 indicate that the second REPP 209 would face a higher burden than the third REPP 210 in delivering power to the first REPP 208. The relative burden determination module 230 may assign a higher burden score to the second REPP 209 than to the third REPP 210. As another example, the relative burden determination module 230 may determine that there is higher demand for power from grid 206 customers near the third REPP 210 than from grid customers near the second REPP 209. The relative burden determination module 230 may assign a higher burden score to the third REPP 210 than to the second REPP 209 due to the opportunity cost of supplying the station power instead of providing power to grid 206 customers. In some embodiments, multiple factors will be used to determine the burden scores for each REPP 208-211. If all else is equal, the power flow control module 222 may cause power to flow from the REPPs 208-211 with the lowest burden scores to the requesting REPP 208-211.

As discussed above, operational disruption, efficiency losses, and opportunity costs may be considered when calculating need scores and burden scores. When calculating need scores, operational disruption may include, for example, disruption or efficiency losses caused by a temporary shutdown due to lack of station power and the later startup of a requesting power plant. When calculating burden scores, operational disruption may include, for example disruption or efficiency losses caused when additional generating capacity as a provider power plant is brought online. Disruption and efficiency losses from using stored power in an ESS may also be considered in calculating need scores or burden scores. For example, it may be more efficient for a power plant with an ESS to request station power from another power plant than to use stored power from the ESS for station power, so that the stored power in the ESS can be used to supply customer or station power needs at a later time. Need scores and burden scores may also take into account expected customer demand. For example, if a requesting power plant is required to supply all power demanded of it by a customer, and historical data suggests that customer demand will soon increase, the requesting power plant may have a higher need score so that the requesting power plant will not shut down and have to restart before the high demand period. Considering opportunity costs to determine need scores and burden scores may refer to supplying the power generated by the power plants to the load with the highest demand. At certain times, there may be a higher demand for other power uses than for station power at a particular power plant. For example, the demand for residential power may be higher in the early evening than the demand for station power at a solar plant, which may be offline until the next morning. While the loss of station power may cause some disruption to the solar plant, the demand for residential power may outweigh such a disruption. In determining the need scores and burden scores, the system may consider the relative power demand to determine the best use of the available power. In some cases, the burden on a potential provider REPP may be compared to the need of a requesting REPP, and if the burden outweighs the need, the potential provider REPP may not supply power to the requesting REPP, even if is capable of doing so.

The power flow control module 222 may use the need scores and the burden scores to determine which REPPs 208-211 should supply power to and receive power from the other REPPs 208-211. For example, the power flow control module 222 may determine that power should be supplied from the REPP 208-211 with the lowest burden score before power is supplied from REPPs 208-211 with higher burden scores. The power flow control module 222 may also determine that power should be supplied to the REPP 208-211 with the highest need score before power supplied to the REPPs 208-211 with lower need scores. Thus, the transmission of power between REPPs 208-211 may be optimized such that REPPs 208-211 with the lowest burden scores supply power to REPPs 208-211 requesting power that have the highest need scores, maximizing the efficiency of the system 200.

The power flow measurement module 232 may comprise programmable instructions that, upon execution, cause processor 218 to receive measurements from the REPPs 208-211 and/or grid 206 indicating a measured amount of power flowing into and out of the REPPs 208-211. For example, each REPPs 208-211 may include one or more meters configured to measure the amount of power flowing into and out of the respective REPP 208-211. The power flow measurement module 232 may receive and analyze these measurements, which may further be used to determine power needs and available power at each REPP 208-211. The notification generation module 234 may comprise programmable instructions that, upon execution, cause processor 218 to generate and send notifications to the operators of the REPPs 208-211. For example, the notification generation module 234 may send a notification to the operator of a REPP 208-211 indicating how much of the available power from the REPP 208-211 will be used to provide station power to another REPP 208-211. As another example, the notification generation module 234 may send a notification to the operator of the grid 206 or users of power from the grid 206 indicating an amount of power expected to be supplied to a REPP 208-211 for station power or a measured amount of power that was previously supplied to a REPP 208-211 for station power.

Figure 3:
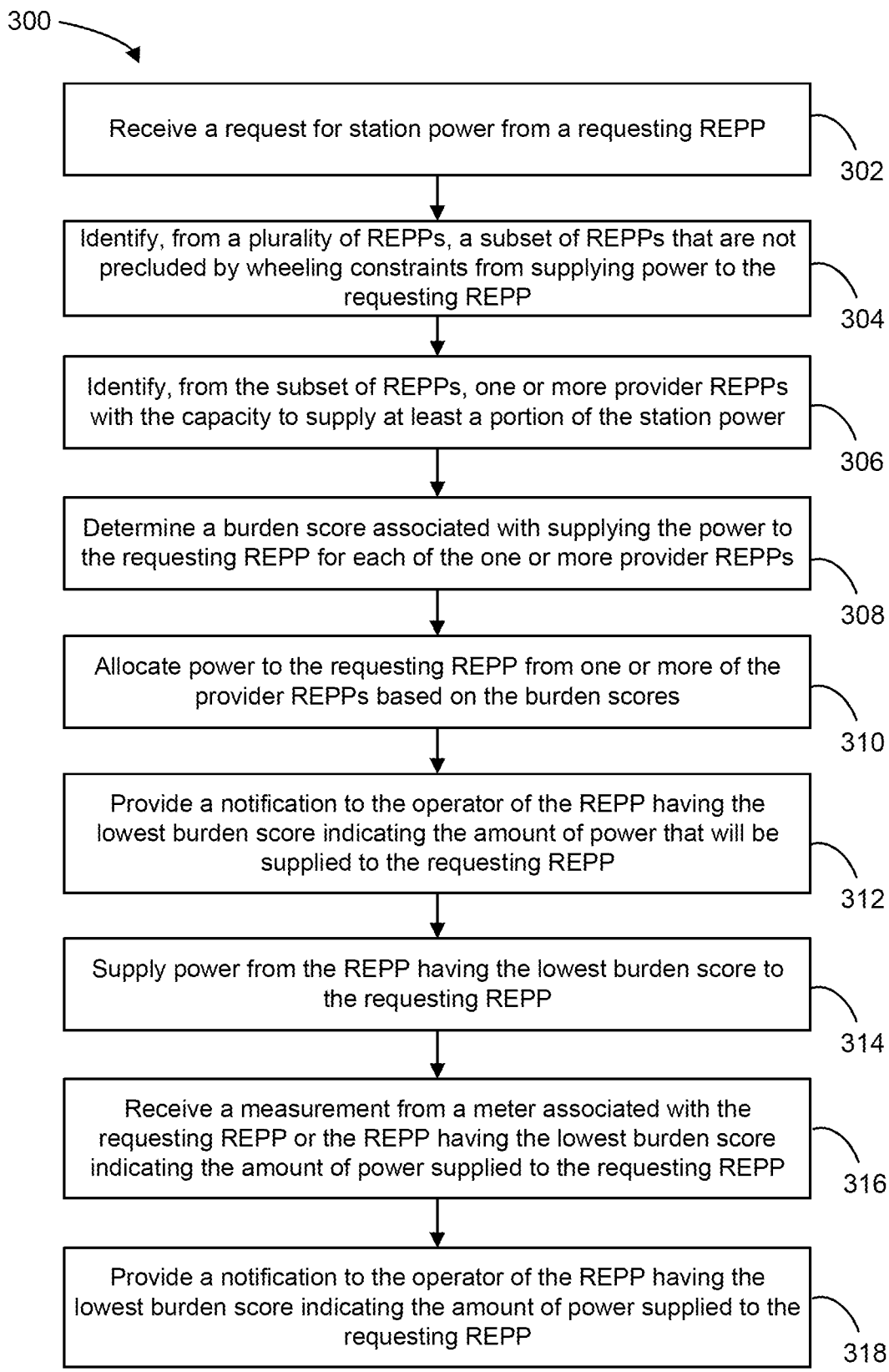
FIG. 3 illustrates a flowchart of an example method for controlling the flow of power between power plants, according to some embodiments.
Figure 4:
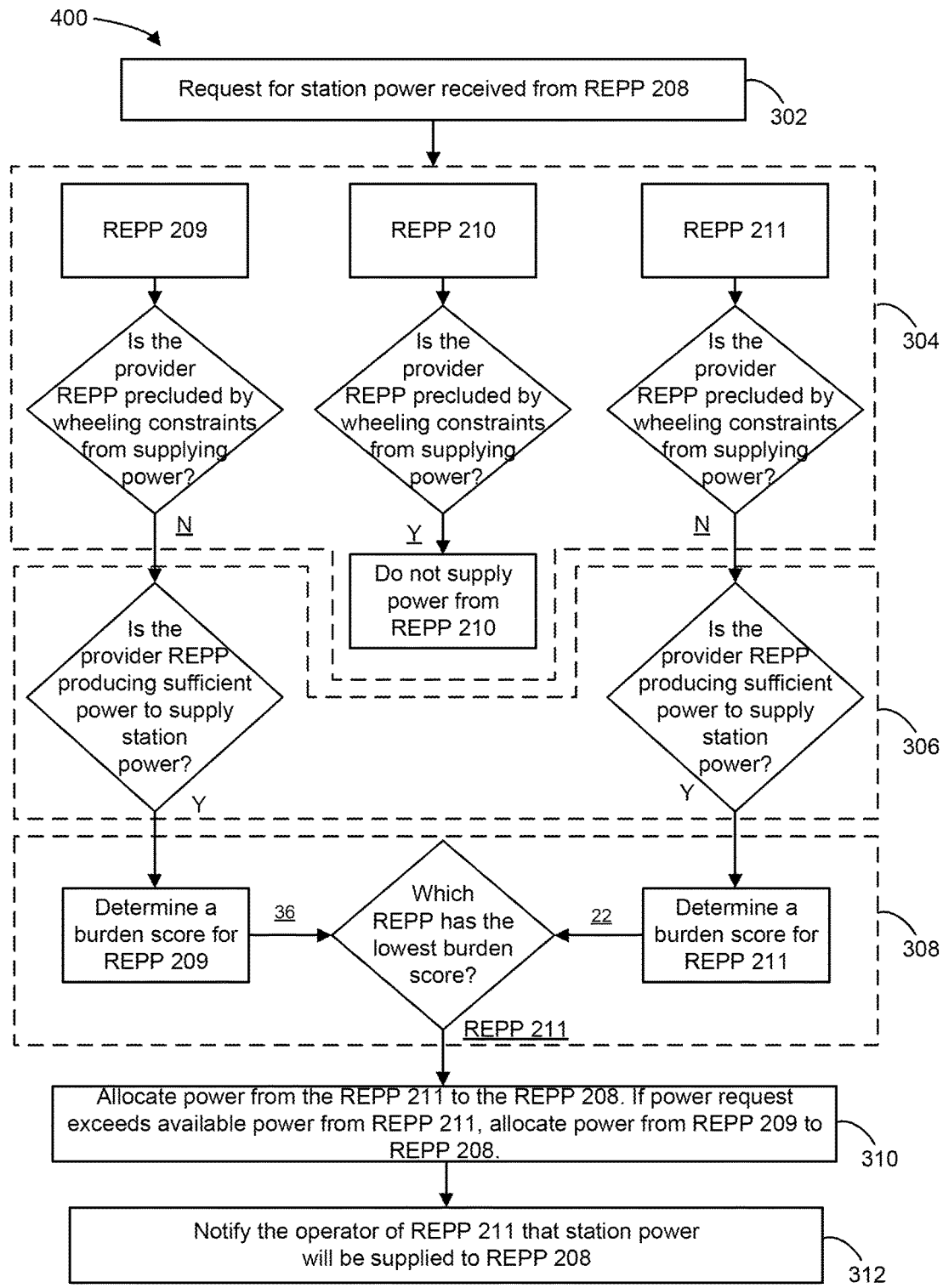
FIG. 4 illustrates a flowchart of an example of the method of FIG. 3 performed by the system of FIG. 2.

Referring now to FIGS. 3 and 4, a method 300 for wheeling power between power plants and a flowchart of an example 400 of the method 300 are respectively shown, according to some embodiments. The example 400 shows an embodiment of the method 300 performed using the system 200. While the methods described herein refer to wheeling power between REPPs, it should be understood that the methods can be applied to groups non-renewable power plants or to groups including non-renewable power plants and REPPs. The method 300 can be performed by one or more processing circuits (e.g., a computer, a controller, the supervisory controller 204, etc.). The processing circuit may control equipment that operates to control the flow of electricity into and out of the power plants or may send signals to other processing circuits that control the flow of electricity into and out of the power plants (e.g., a controller of a power plant, a computer associated with a power plant, the RES SCADA controller 12, etc.). Each power plant may be connected to the grid and may be controlled by a common operator (e.g., via the supervisory controller 204). The processing circuit may control the flow of power so that the station power of a requesting power plant may be provided by one or more provider power plants via the grid.

At operation 302 of the method 300, the processing circuit receives a request for station power from a requesting REPP. The requesting REPP may not be able to produce sufficient power to supply its own station power and thus may require power from an external source, such as the grid or another power plant. For example, a solar power plant may not be able to supply its own station power on a very cloudy day. In the example 400, the request for station power is received by the supervisory controller 204 from the first REPP 208.

At operation 304 of the method 300, the processing circuit identifies a subset of REPPs, from a plurality of REPPs controlled by the processing circuit, that are not precluded by wheeling constraints from providing power. Some REPPs may not be able to supply power to the requesting REPP due to grid constraints, such as if the grid does not have the physical capacity to deliver the power between the two REPPs or if the operator of the grid does not allow the power to be transmitted between certain REPPs. In the example 400, the supervisory controller 204 (e.g., the constraint detection module 224) determines that the third REPP 210 is precluded from supplying station power to the first REPP 208 by wheeling constraints and that the second REPP 209 and the fourth REPP 211 are not precluded from supplying station power. Thus, the supervisory controller 204 determines that the subset of REPPs not precluded from supplying power to the first REPP 208 consists of the second REPP 209 on the fourth REPP 211.

At operation 306 of the method 300, the processing circuit identifies, from the subset of REPPs, one or more provider REPPs with the power producing capacity to supply at least a portion of the station power to the requesting REPP. For example, a first REPP may have the power producing capacity to supply its own station power, to supply the power demanded of it by its customers, and to supply a portion of the station power for the requesting REPP, while a second REPP may only have the power producing capacity to supply its own station power and the power demanded of it by its customers. In the example 400, the supervisory controller 204 (e.g., the available power determination module 226) is configured to determine whether each of the second REPP 209 and the fourth REPP 211 have the power producing capacity to supply at least a portion of the station power to the first REPP 208. In example 400, supervisory controller 204 determines that both the second REPP 209 and the fourth REPP 211 have the power producing capacity to supply at least a portion of the station power to the first REPP 208.

At operation 308 of the method 300, the processing circuit determines a burden score associated with supplying power to the requesting REPP for each of the one or more REPPs having the power producing capacity to supply the station power for the requesting REPP. The burden score may represent the relative burden for the one or more REPPs to provide power to the requesting REPP. For example, a higher burden score may be associated with operational disruption resulting from supplying the power to the requesting REPP, efficiency losses from supplying the power to the requesting REPP, and higher opportunity costs of delivering power to the requesting rather than selling the power to the market on the grid. Opportunity costs may be determined by the demand for power from other customers on the grid and/or contractual penalties owed by the REPP if minimum power delivery commitments are not met. In the example 400, the supervisory controller 204 (e.g., the relative burden determination module 230) determines that the burden score for the second REPP 209 is 36 and the burden score for the fourth REPP 211 is 22, thus determining that the fourth REPP 211 has the lower burden score of the two REPPs 209, 211 having the power producing capacity to supply the station power to the first REPP 208.

At operation 310 of the method 300, the processing circuit allocates power from the provider REPPs to the requesting REPP according to the burden scores. Power may first be allocated from the provider REPP having the lowest burden score, then, if needed, from the provider REPP having the second lowest burden score, then, if needed, from the provider REPP having the third lowest burden score, and so on. In the example 400, power is first allocated from the fourth REPP 211, which has the lowest burden score, to the requesting REPP 208. If the requesting REPP 208 requires additional power to meet its station power needs, power may then be allocated from the second REPP 209. If the requesting REPP 208 requires more power than is available from the second REPP 209 and the fourth REPP 211 combined, all of the available power from both the second REPP 209 and the fourth REPP 211 may be allocated to the requesting REPP 208. If the combined available power from the second REPP 209 and the fourth REPP 211 exceeds the power requested by the requesting REPP 208, power will first be allocated to the requesting REPP 208 from the fourth REPP 211. After all the power from the fourth REPP 211 has been allocated, power from the second REPP 209 may be allocated to meet the remaining power requirements of the requesting REPP 208. In some embodiments, more than one REPP may request station power. Power from REPPs with available power may be allocated to multiple requesting REPPs based on the burden scores, so that the REPPs with available power may collectively serve the request of the multiple requesting REPPs.

In some embodiments, the processing circuit may consider other factors in determining whether a REPP will provide power to a requesting power plant. For example, if requests for power from the REPP and are received from multiple power plants, the processing circuit may prioritize providing power to other REPPs over nonrenewable power plants or may exclude nonrenewable power plants altogether for a specified time period. As another example, the processing circuit may prioritize or exclude requesting power plants in certain geographical locations or may prioritize or exclude certain types of requesting REPPs over others (e.g., prioritizing wind plants over solar plants, prioritizing plants with or without energy storage systems, etc.). In some embodiments, power plants may be prioritized or excluded based on expected weather conditions. For example, a solar plant with an energy storage system may be excluded from receiving power from the REPP if it is determined that the energy storage system has sufficient stored energy to supply the station power until sunny weather is expected. In some embodiments, these factors may be considered in determining the need score. In some embodiments, these factors may cause a power plant to be entirely excluded from consideration for receiving power from the CPP, similar to those power plants excluded or precluded due to wheeling constraints. Similarly, in some embodiments, the processing circuit may consider other factors in determining whether a REPP will receive power from a particular power plant. For example, a requesting REPP may supply customers that require that all power supplied from the REPP, including the station power of the REPP, comes from renewable sources. In this case, the processing circuit may exclude nonrenewable power plants from providing station power to the requesting REPP.

At operation 312 of the method 300, the processing circuit provides a notification to the operator of the provider REPP having the lowest burden score. The notification may indicate the amount of power that will be supplied to the requesting REPP from the provider REPP. In some embodiments, a notification may be provided to each provider REPP from which power has been allocated to the requesting REPP (e.g., to the operator of the provider REPP with the second lowest burden score, etc.). In the example 400, supervisory controller 204 (e.g., the notification generation module 234) will generate and send a notification to the fourth REPP 211 indicating the amount of power that will be supplied to first REPP 208 from the fourth REPP 211. The supervisory controller 204 may also generate and send a notification to the second REPP 209 indicating the amount of power that will be supplied to the first REPP 208 from the second REPP 209.

At operation 314 of the method 300, the processing circuit supplies power from the provider REPP having the lowest burden score to the requesting REPP. For example, the processing circuit may control equipment of the provider REPP that operates to control the flow of electricity from the provider REPP or may send instructions to a controller of the provider REPP to control the flow of electricity. The processing circuit may also control equipment on the grid or may send instructions to the grid causing power to flow from the provider REPP to the requesting REPP or requesting that power be delivered from the provider REPP to the requesting REPP. The processing circuit may also control equipment of the requesting REPP or send instructions to a controller of the requesting REPP causing the requesting REPP to receive power generated by the provider REPP via the grid. In some cases, the processing circuit may also supply power from the additional provider REPPs based on the determined power allocation. Though not shown, in example 400, supervisory controller 204 (e.g., the power flow control module 222) sends signals causing equipment to be controlled to supply power from the fourth REPP 211 to the first REPP 208 via the grid 206. For example, the supervisory controller 204 may send an instruction to the fourth REPP 211 to supply power to the grid 206, may send an instruction to the grid 206 to deliver the power to the first REPP 208, and may send an instruction to the first REPP 208 to receive the power from the grid 206.

At operation 316 of the method 300, the processing circuit receives a measurement from a meter associated with the requesting REPP or the provider REPP having the lowest burden score. The measurement may indicate the amount of power that is supplied by the provider REPP to the requesting REPP via the grid. At operation 318 of the method 300, the processing circuit provides a notification to the operator of the provider REPP having the lowest burden score. The notification may indicate the amount of power supplied by the provider REPP. In some embodiments, a similar notification may also be sent to the requesting REPP. Though not shown, in the example 400, supervisory controller 204 (e.g., the power flow measurement module 232) may receive a measurement from a meter associated with the fourth REPP 211 indicating the amount of power supplied from the fourth REPP 211 to the first REPP 208. Then, the supervisory controller 204 (e.g., the notification generation module 234) may send a notification to the operator of the fourth REPP 211 indicating the amount of power supplied.

Figure 5:
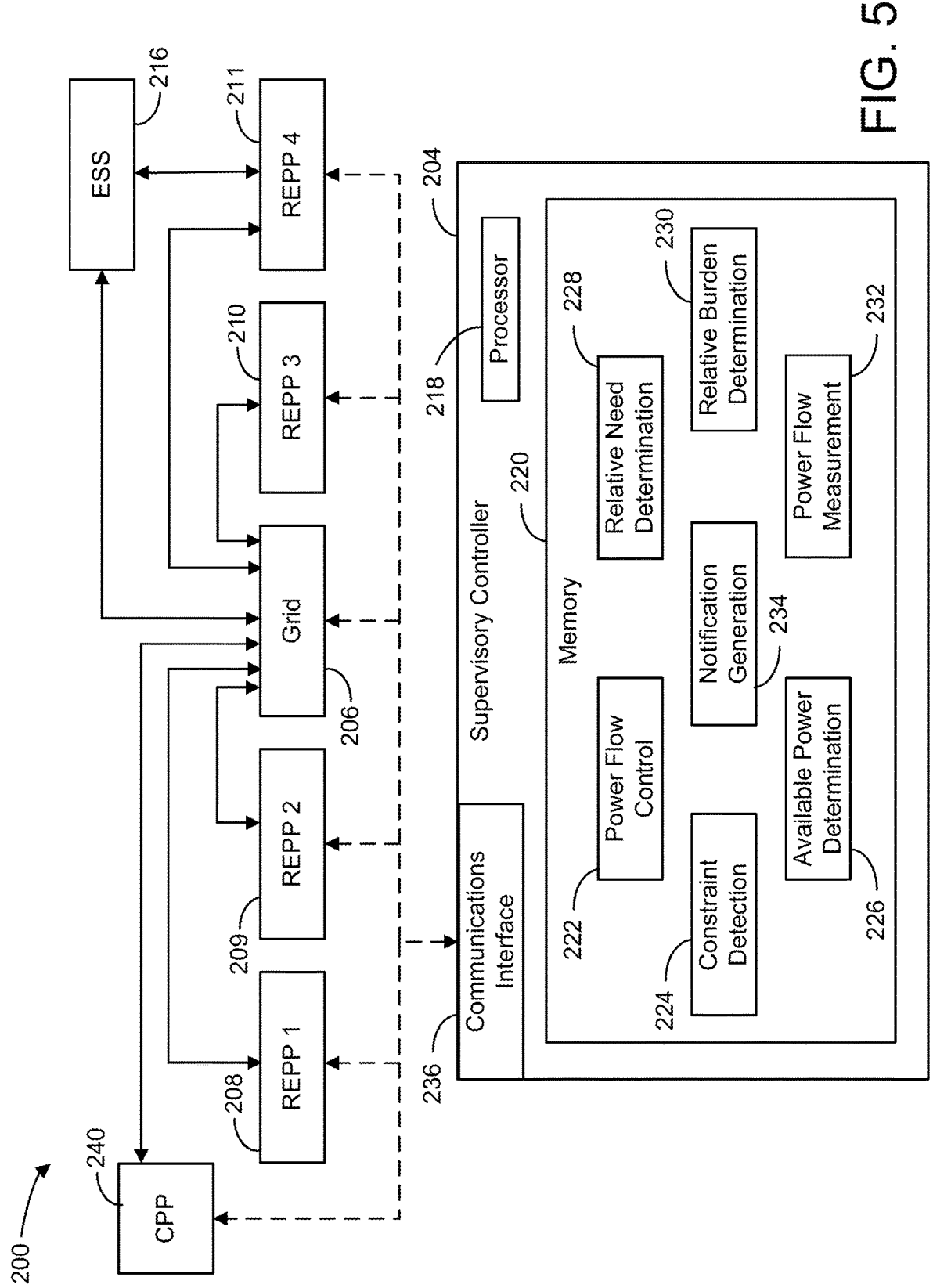
FIG. 5 illustrates a block diagram of an example system for controlling the flow of power between power plants, according to some embodiments.

Referring now to FIG. 5, a system 200 for controlling the flow of power between power plants is shown, in accordance with some embodiments of the present disclosure. The system 200 of FIG. 4 may be substantially similar to the system 200 of FIG. 2 but may include a cooperative power plant 240 (CPP). The CPP may be a REPP or a non-renewable power plant. The CPP 240 may be communicatively coupled to the communications interface 236 of the supervisory controller 204. CPP 240 may be configured to supply station power to each of the REPPs 208-211, via the grid 206, when an REPP 208-211 is unable to produce sufficient power to supply its own station power. The supervisory controller 204 may receive information about the expected and actual available power from the CPP 240. The supervisory controller 204 may then receive requests for power from each of one or more REPPs 208-211. If the supervisory controller 204 determines that the CPP 240 is able to supply enough power to meet all of the requests of the REPPs 208-211, supervisory controller 204 may control the CPP 240 to provide the power to the REPPs 208-211 via the grid 206 or may send instructions to a controller of the CPP 240 to provide the power. If supervisory controller 204 determines that the CPP 240 is not able to supply enough power to meet all of the requests of the REPPs 208-211, supervisory controller 204 may determine which of the requests should be met. In some embodiments, supervisory controller 204 may be part of the control system of CPP 240 or may communicate with a controller of the CPP 240.

Figure 6:
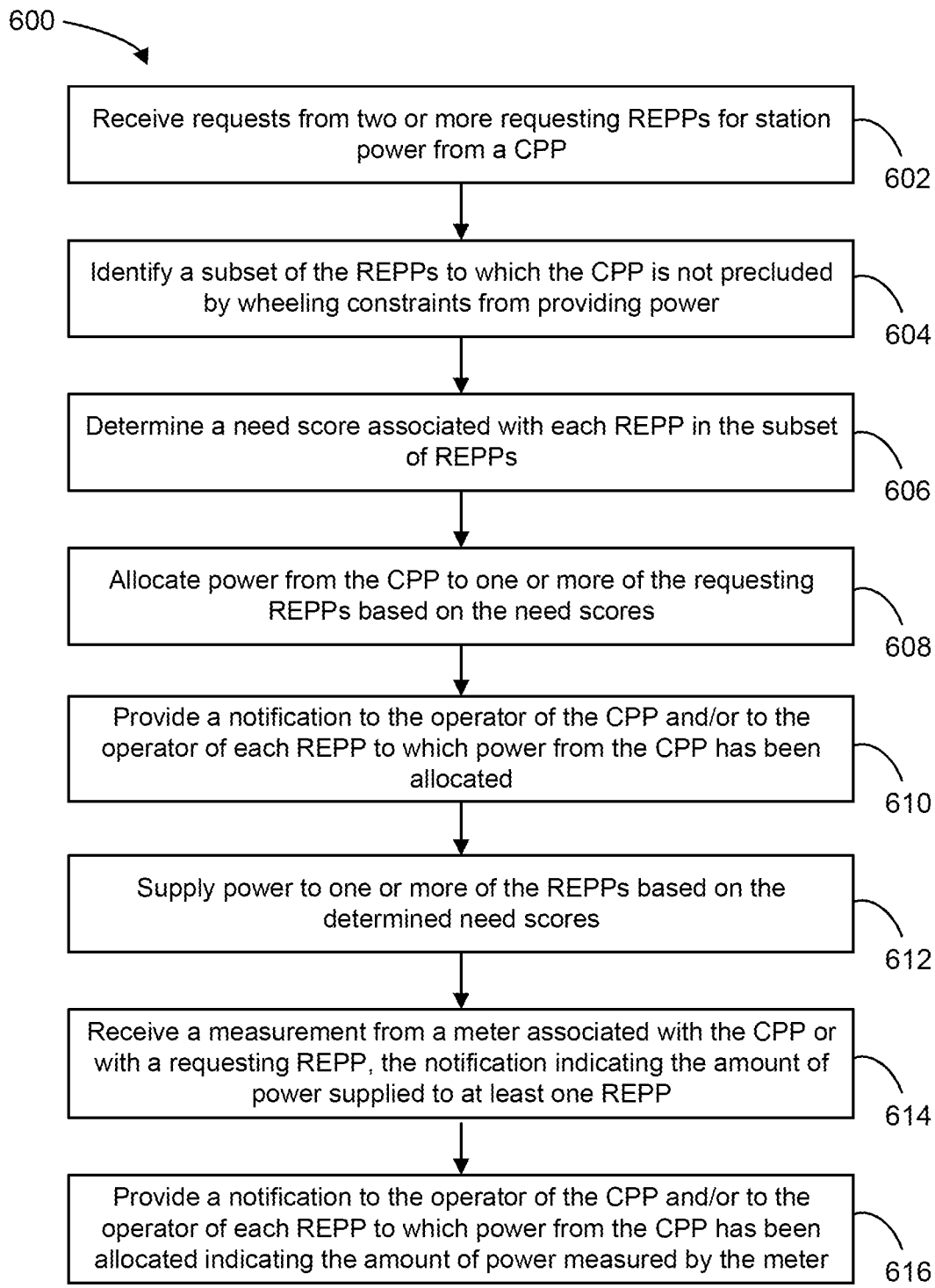
FIG. 6 illustrates a flowchart of an example method for controlling the flow of power between power plants, according to some embodiments.
Figure 7:
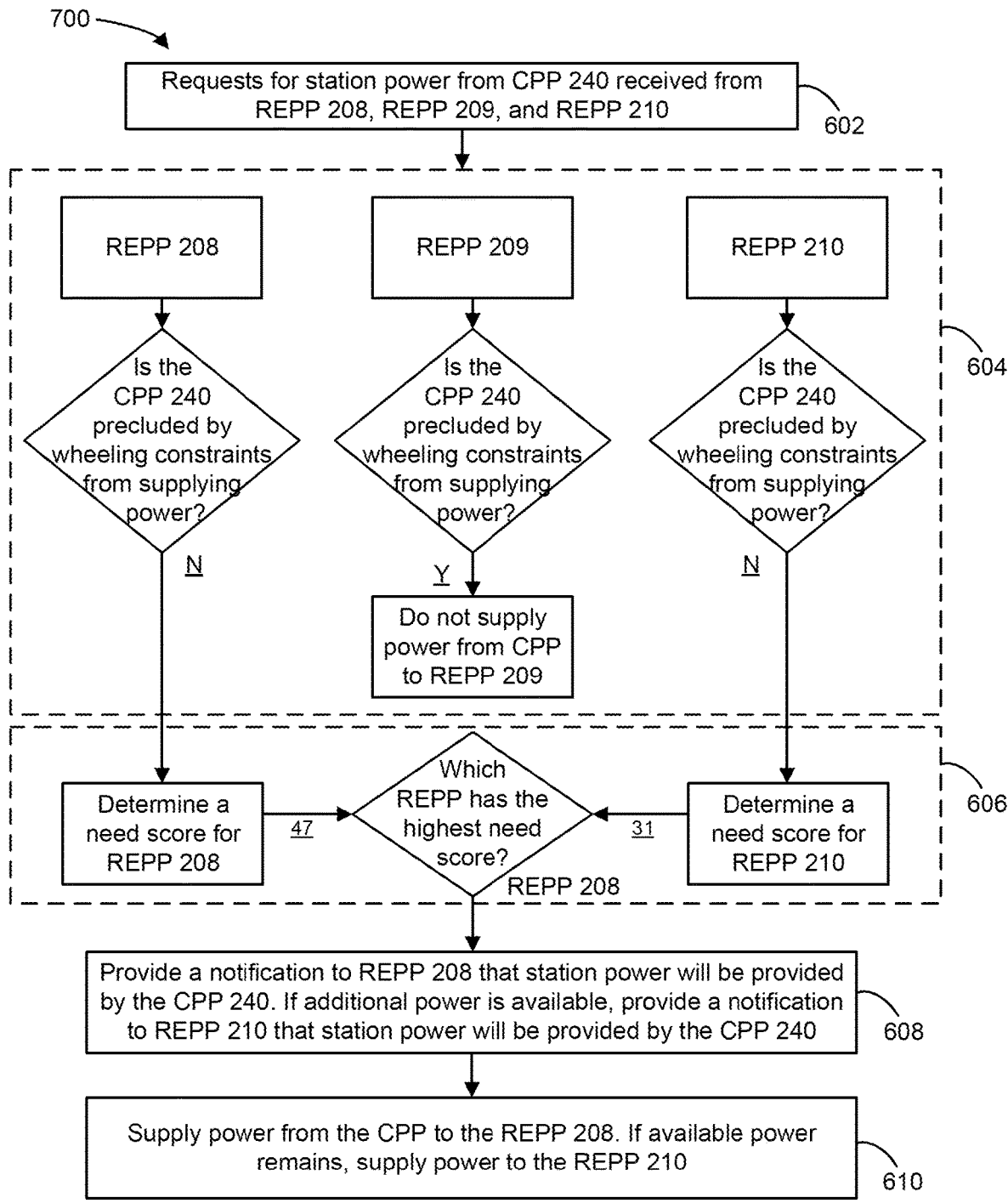
FIG. 7 illustrates a flowchart of an example of the method of FIG. 6 performed by the system of FIG. 5.

Referring now to FIGS. 6 and 7, a method 600 for wheeling power from a CPP to two or more REPPs and a flowchart of an example 700 of the method 600 are respectively shown, according to some embodiments. The example 700 shows an embodiment of the method 600 performed using the system 200 of FIG. 5. While the methods described herein refer to wheeling power from a CPP to REPPs, it should be understood that the methods can be used to wheel power from a CPP to non-renewable power plants or to a mix of non-renewable power plants and REPPs. The method 600 can be performed by one or more processing circuits (e.g., a computer, a controller, the supervisory controller 204, etc.). The processing circuit may control equipment that operates to control the flow of electricity into and out of the power plants or may send signals to other processing circuits that control the flow of electricity into and out of the power plants (e.g., a controller of a power plant, a computer associated with a power plant, the RES SCADA controller 12, etc.). Each power plant may be connected to the grid and may be controlled by a common operator (e.g., via the supervisory controller 204). The processing circuit may control the flow of power so that the station power of a requesting power plant may be provided by one or more provider power plants via the grid.

At operation 602 of the method 600, the processing circuit receives requests from two or more requesting REPPs for station power from a CPP. The requesting REPPs may not be able to produce sufficient power to supply their own station power and thus may require power from an external source, such as the grid or another power plant (e.g., a CPP). For example, a solar power plant may not be able to supply its own station power on a very cloudy day. In the example 700, requests are received, by the supervisory controller 204 from the first REPP 208, the second REPP 209, and the third REPP 210, for station power from the CPP 240.

At operation 604 of the method 600, the processing circuit identifies a subset of the requesting REPPs to which the CPP is not precluded by wheeling constraints from providing power. The CPP 240 may not be able to supply power to the one or more of the requesting REPPs due to grid constraints, such as if the grid does not have the physical capacity to deliver the power from the CPP to the REPP. In the example 700, the supervisory controller 204 (e.g., the constraint detection module 224) determines that the CPP 240 is precluded from supplying station power to the second REPP 209 by wheeling constraints but is not precluded from supplying station power to the first REPP 208 and the third REPP 210. Thus, the supervisory controller 204 determines that the subset of REPPs to which the CPP 240 is not precluded from supplying power consists of the first REPP 208 on the third REPP 210.

At operation 606 of the method 600, the processing circuit determines a need score associated each requesting REPP in the subset of REPPs to which the CPP is not precluded form supplying power. The need score may represent the relative need of each requesting REPP for power from the CPP. For example, a higher need score may be associated with operational disruption if power is not supplied to the requesting REPP, lower efficiency losses from supplying the power to the requesting REPP, and higher opportunity costs from taking power from the grid at market or contractual rates or from lost sales and/or contractual penalties due to lost operational time. In the example 700, the supervisory controller 204 (e.g., the relative need determination module 228) determines that the need score for the first REPP 208 is 47 and the need score for the power to third REPP 210 is 31, thus determining that the first REPP 208 has the higher need score of the two REPPs 208, 210 to which the CPP 240 is not precluded from supplying power.

At operation 608 of the method 600, the processing circuit allocates power from the CPP to one or more of the requesting REPPs based on the determined need scores. The CPP may first provide power to the REPP having the highest need score. If the CPP produces enough power to supply all of the station power to the REPP having the highest need score, remaining power from the CPP may be allocated to the REPP with the next highest need score, and so on. Power from the CPP may be allocated to as many REPPs as possible according to their respective need scores. In the example 700, supervisory controller 204 (e.g., the available power determination module 226) may determine that power should first be supplied to the first REPP 208. If the amount of power generated by the CPP exceeds the power requested by the first REPP 208, supervisory controller 204 may determine that the additional power should be supplied to third REPP 210. For example, if the first REPP 208 requires 10 kW of station power, the third REPP 210 requires 8 kW of station power, and the CPP 240 produces 15 kW of power, the supervisory controller 204 may determine that 10 kW of power will be provided to the first REPP 208 by the CPP 240 and the remaining 5 kW of power will be provided to the third REPP 210 by the CPP 240. The third REPP 210 could then receive its remaining 3 kW of station power from the grid 206 at market or contractual rates.

In some embodiments, the processing circuit may consider other factors in determining whether the CPP will provide power to a requesting power plant. For example, if requests for power from the CPP are received from multiple power plants, the processing circuit may prioritize providing power to REPPs over nonrenewable power plants or may exclude nonrenewable power plants altogether for a specified time period. As another example, the processing circuit may prioritize or exclude power plants in certain geographical locations or may prioritize or exclude certain types of REPP over others (e.g., prioritizing wind plants over solar plants, prioritizing plants without energy storage systems, etc.). In some embodiments, plants may be prioritized or excluded based on expected weather conditions. For example, a solar plant with an energy storage system may be excluded from receiving power from the CPP if it is determined that the energy storage system has sufficient stored energy to supply the station power until sunny weather is expected. In some embodiments, these factors may be considered in determining the need score. In some embodiments, these factors may cause a power plant to be entirely excluded from consideration for receiving power from the CPP, similar to those power plants excluded or precluded due to wheeling constraints.

At operation 610 of the method 600, a notification is provided to the operator of each REPP to which the CPP will provide power indicating the amount of power that is allocated. Additionally, or alternatively, a notification is provided to the operator of the CCP indication how much power is allocated by the CPP to the requesting REPPs. In the example 700, supervisory controller 204 (e.g., the notification generation module 234) may generate and send a notification to the first REPP 208 (e.g., the operator of the REPP 208) indicating the amount of power that is allocated to the first REPP 208 by the CPP 240. If additional power is available from the CPP 240, supervisory controller 204 (e.g., the notification generation module 234) may generate and send a notification to the third REPP 210 (e.g., the operator of the REPP 210) indicating the amount of power that is allocated to the third REPP 210 by the CPP 240. Supervisory controller 204 (e.g., the notification generation module 234) may also generate and send a notification to the CPP 240 (e.g., the operator of the CPP 240) indicating the amount of power that is allocated to each REPP 208, 210. In some embodiments, a notification may be provided to the operator of each REPP to which the CPP is unable to provide power due to wheeling constraints or which will not receive power due to a relatively low need score At operation 612 of the method 600, the processing circuit supplies power from the CPP to the one or more of the REPPs according to the power supply determination of operation 608. For example, the processing circuit may control equipment of the CPP that operates to control the flow of electricity from the CPP or may send instructions to a controller of the CPP to control the flow of electricity from the CPP to the grid. The processing circuit may also control equipment on the grid or may send instructions to the grid causing power to flow from the CPP to the requesting REPP or requesting that power be delivered from the CPP to the requesting REPP. The processing circuit may also control equipment of the requesting REPP or send instructions to a controller of the requesting REPP causing the requesting REPP to receive power generated by the CPP via the grid. In example 700, supervisory controller 204 (e.g., the power flow control module 222) causes power to be supplied from the CPP 240 to the first REPP 208 and the third REPP 210 via the grid 206. For example, the supervisory controller 204 may send an instruction to the CPP 240 to supply power to the grid 206, may send an instruction to the grid 206 to deliver the power to the first REPP 208 and the third REPP 210, and may send an instruction to the first REPP 208 and the third REPP 210 to receive the power from the grid 206.

At operation 614 of the method 600, the processing circuit receives a measurement from a meter associated with the CPP or with at least one requesting REPP indicating the amount of power that is supplied to the requesting REPPs via the grid. At operation 316 of the method, the processing circuit provides a notification to the operator of the CPP or the operator of each REPP to which power is allocated, the notification indicating the amount of power supplied by the CPP to supply station power to the REPPs. In the example 700, supervisory controller 204 (e.g., the power flow measurement module 232) may receive a measurement from a meter associated with the CPP 240 indicating the amount of power supplied to the first REPP 208 and the third REPP 210. Then, the supervisory controller 204 (e.g., the notification generation module 234) may send a notification to the operator of the CPP 240 indicating the amount of power supplied.

Figure 8:
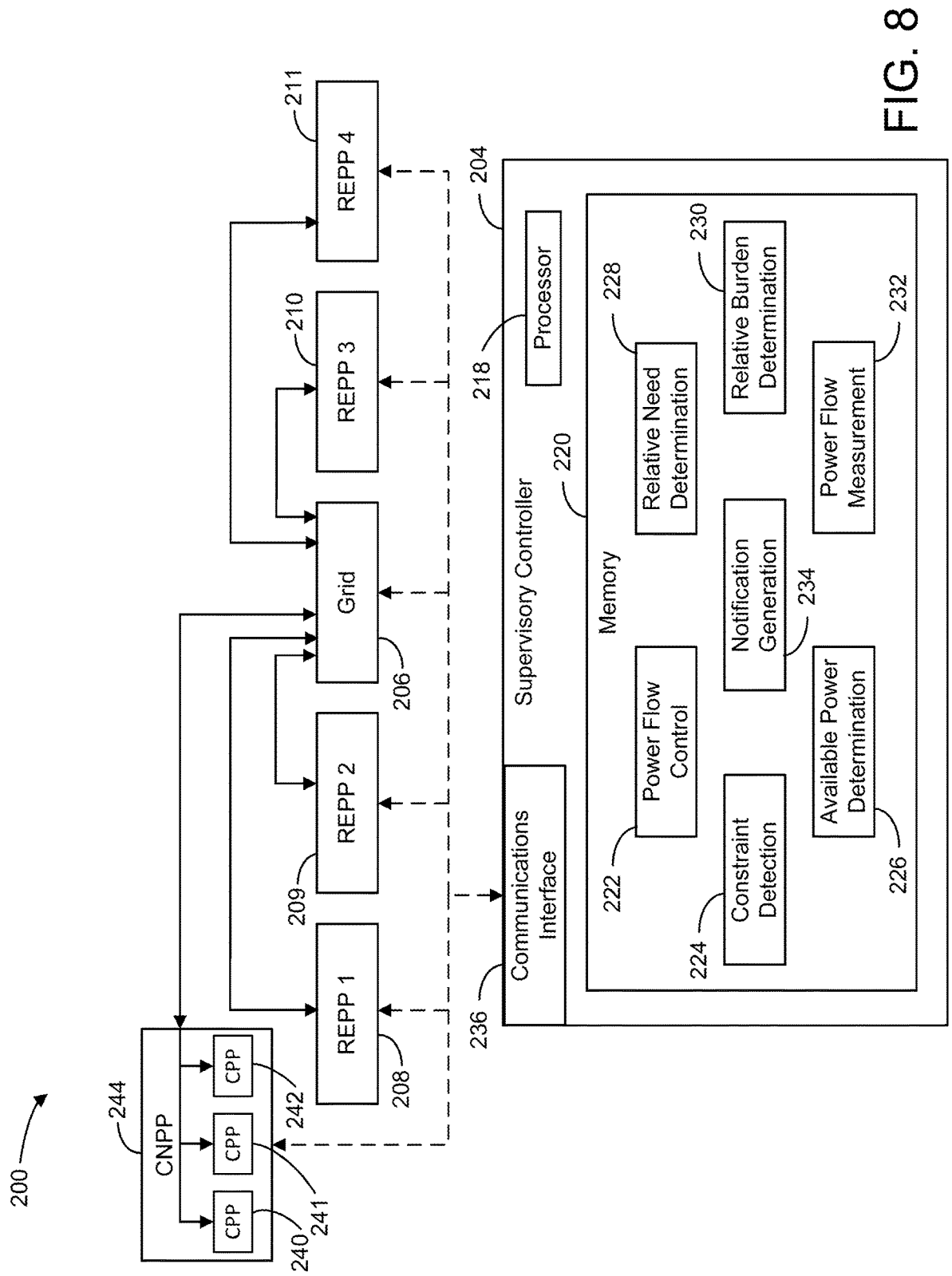
FIG. 8 illustrates a block diagram of an example system for controlling the flow of power between power plants, according to some embodiments.

Referring now to FIG. 8, a system 200 for controlling the flow of power between power plants is shown, in accordance with some embodiments of the present disclosure. The system 200 of FIG. 8 may be substantially similar to the system 200 of FIG. 5 but may include a cooperative network of power plants 244 (CNPP). The CNPP 244 may include two or more CPPs 240-242 (e.g., similar to the CPP 240 of FIG. 5). Each CPP 240-242 may be a REPP or a non-renewable power plant. Each CPP 240-242 in the CNPP 244 may be communicatively coupled to the communications interface 236 of the supervisory controller 204. Each CPP 240-242 may be configured to supply station power to at least one of the REPPs 208-211, via the grid 206, when an REPP 208-211 is unable to produce sufficient power to supply its own station power. The supervisory controller 204 may receive information about the expected and actual available power from the CPPs 240-242. The supervisory controller 204 may then receive requests for power from each of one or more REPPs 208-211. If the supervisory controller 204 determines that the CPPs 240-242 in the CNPP 244 are collectively able to supply enough power to meet all of the requests of the REPPs 208-211, supervisory controller 204 may control the CPPs 240-242 to provide the power to the REPPs 208-211 via the grid 206 or may send instructions to a controller of the CPP 240-242 to provide the power. If supervisory controller 204 determines that the CNPP 244 is not able to supply enough power to meet all of the requests of the REPPs 208-211, supervisory controller 204 may determine which of the requests should be met. If supervisory controller 204 determines that more than one CPP 240-242 is able to supply power to one of the REPPs 208-211, to the supervisory controller 204 may determine which CPP 240-242 may deliver power to the REPP 208-211. In some embodiments, supervisory controller 204 may be a component of CNPP 244 or may communicate with a supervisory controller of the CNPP 244.

Figure 9:
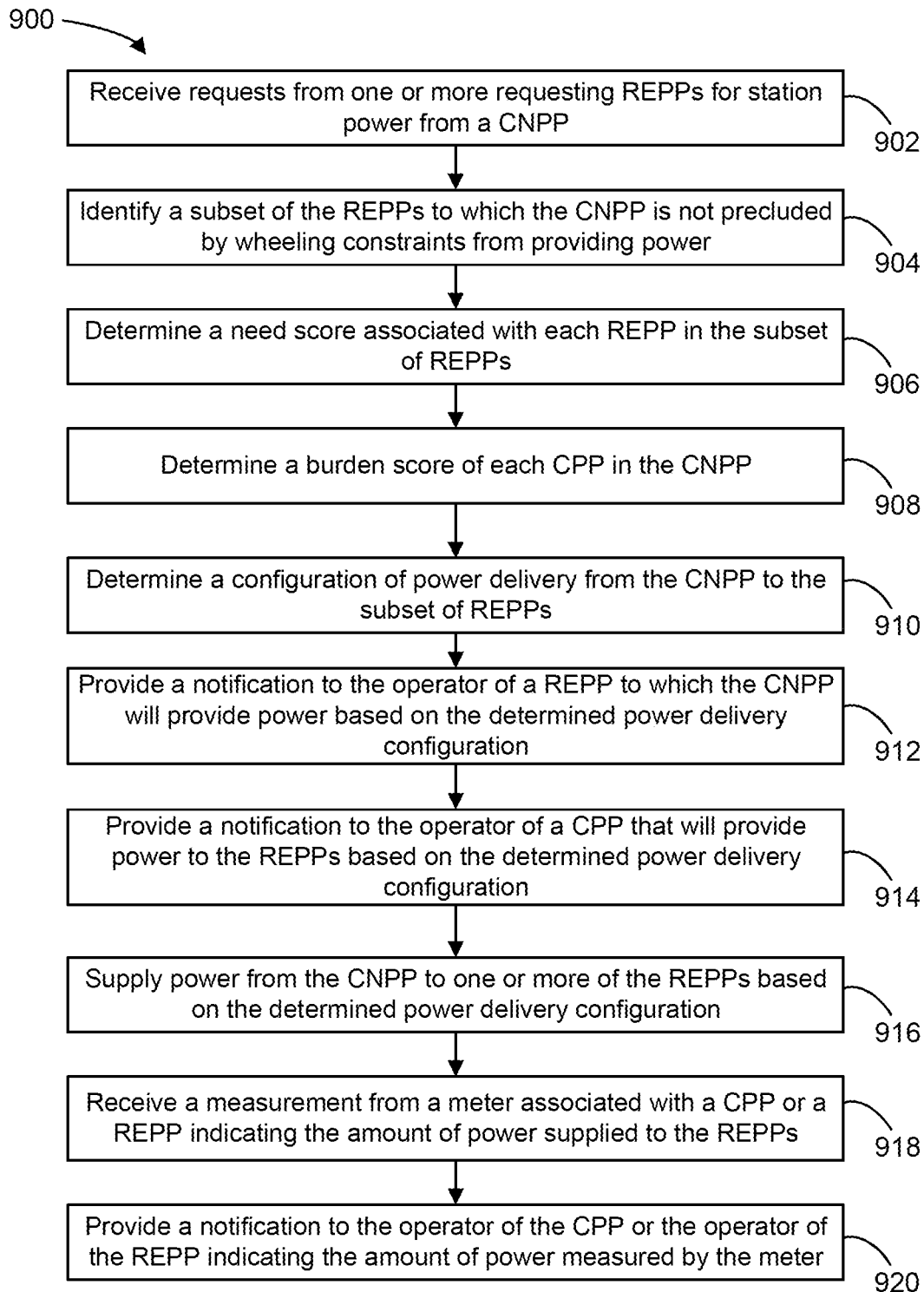
FIG. 9 illustrates a flowchart of an example method for controlling the flow of power between power plants, according to some embodiments.
Figure 10:
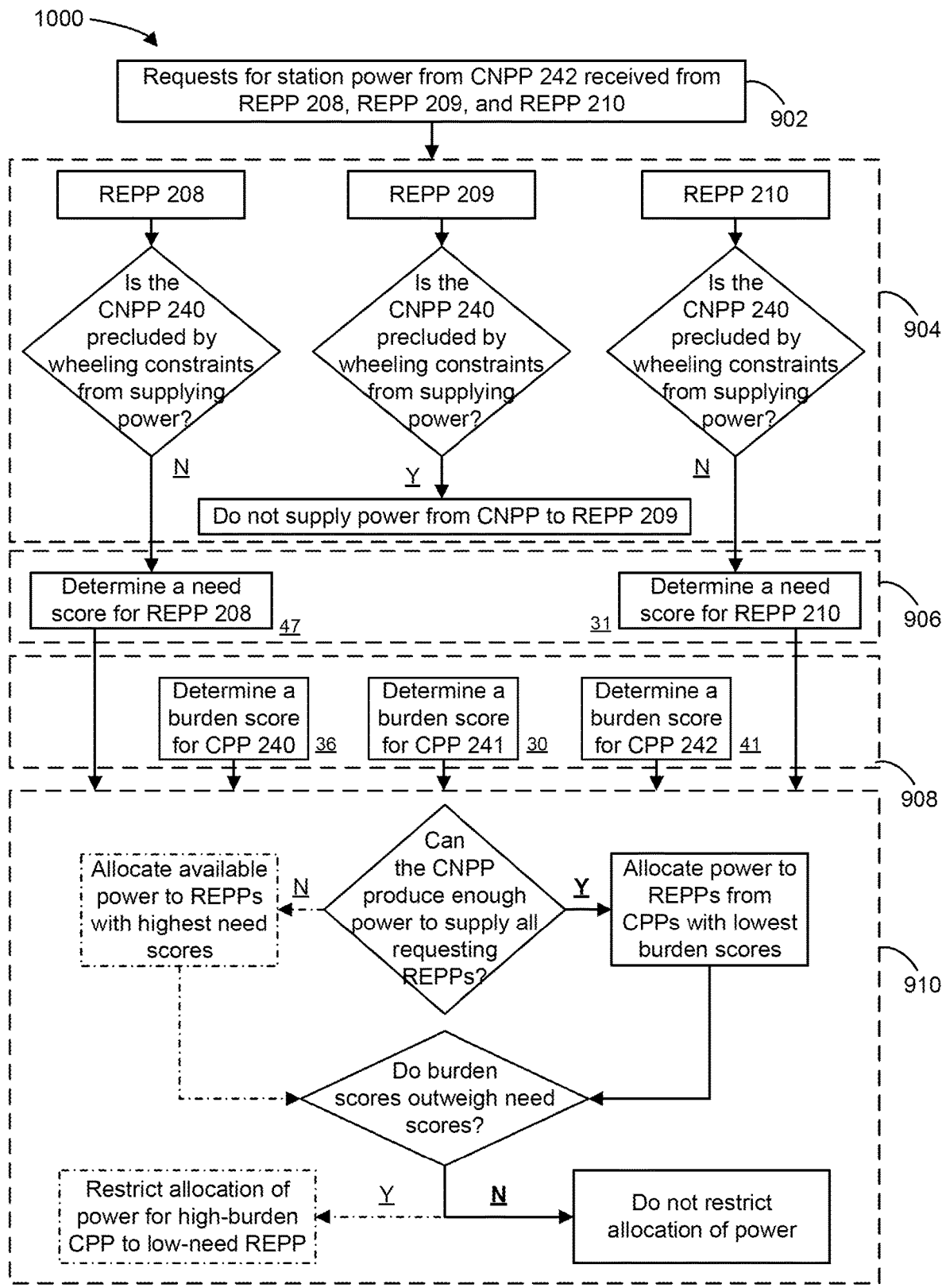
FIG. 10 illustrates a flowchart of an example of the method of FIG. 9 performed by the system of FIG. 8.

Referring now to FIGS. 9 and 10, a method 900 for wheeling power from a CNPP to one or more REPPs and a flowchart of an example 1000 of the method 900 are respectively shown, according to some embodiments. The example 1000 shows an embodiment of the method 900 performed using the system 200 of FIG. 8. While the methods described herein refer to wheeling power from a CNPP to REPPs, it should be understood that the methods can be used to wheel power from a CNPP to non-renewable power plants or to a mix of non-renewable power plants and REPPs. The method 900 can be performed by one or more processing circuits (e.g., a computer, a controller, the supervisory controller 204, etc.). The processing circuit may control equipment that operates to control the flow of electricity into and out of the power plants or may send signals to other processing circuits that control the flow of electricity into and out of the power plants (e.g., a controller of a power plant, a computer associated with a power plant, the REPP SCADA controller 12, etc.). Each power plant may be connected to the grid and may be controlled by a common operator (e.g., via the supervisory controller 204). The processing circuit may control the flow of power so that the station power of a requesting power plant may be provided by one or more provider power plants via the grid.

At operation 902 of the method 900, the processing circuit receives requests from one or more requesting REPPs for station power from a CPP. The requesting REPPs may not be able to produce sufficient power to supply their own station power and thus may require power from an external source, such as the grid or another power plant (e.g., a CPP). For example, a solar power plant may not be able to supply its own station power on a very cloudy day. In the example 1000, requests are received, by the supervisory controller 204 from the first REPP 208, the second REPP 209, and the third REPP 210, for station power from the CNPP 244.

At operation 904 of the method 900, the processing circuit identifies a subset of the requesting REPPs to which the CNPP is not precluded by wheeling constraints from providing power. The CNPP may not be able to supply power to the one or more of the requesting REPPs due to grid constraints, such as if the grid does not have the physical capacity to deliver the power from the CNPP to the REPP. In the example 1000, the supervisory controller 204 (e.g., the constraint detection module 224) determines that the CNPP 244 is precluded from supplying station power to the second REPP 209 by wheeling constraints but is not precluded from supplying station power to the first REPP 208 and the third REPP 210. Thus, the supervisory controller 204 determines that the subset of REPPs to which the CPP 240 is not precluded from supplying power of the first REPP 208 on the third REPP 210. In some embodiments, it may be determined whether each CPP of the CNPP is precluded from supplying power to each of the REPPs by wheeling constraints. For example, the CPP 240 may be able to supply power to the first REPP 208 but may be precluded from supplying power to the second REPP 209. Depending on the geographical locations of the CPPs and REPPs and the current load on the grid, each CPP may or may not be precluded from supplying power to one or more of the REPPs.

At operation 906 of the method 900, the processing circuit determines a need score associated each requesting REPP in the subset of REPPs to which the CNPP is not precluded form supplying power. The need score may represent the relative need of each REPP for power from the CNPP. For example, a higher need score may be associated with operational disruption if power is not supplied to the requesting REPP, lower efficiency losses from supplying the power to the requesting REPP, and higher opportunity costs from taking power from the grid at market or contractual rates or from lost sales and/or contractual penalties due to lost operational time. In the example 1000, the supervisory controller 204 (e.g., the relative need determination module 228) determines that the need score for the first REPP 208 is 47 and the need score for the power to third REPP 210 is 31, thus determining that the first REPP 208 has the higher need score of the two REPPs 208, 210 to which the CPP 240 is not precluded from supplying power.

At operation 908 of the method 900, the processing circuit determines a burden score associated with supplying power to the requesting REPP for each of the CPPs in the CNPP not precluded from supplying power. The burden score may represent the relative burden for the one or more CPPs to provide power to the requesting REPPs. For example, a higher burden score may be associated with operational disruption resulting from supplying the power to the requesting REPP, efficiency losses from supplying the power to the requesting REPP, and higher opportunity costs of delivering power to the requesting rather than selling the power to the market on the grid. In the example 1000, the supervisory controller 204 (e.g., the relative burden determination module 230) determines that the burden score for the first CPP 240 is 36, the burden score for the second CPP 241 is 30, and the burden score for the third CPP 242 is 41. In some embodiments, a separate burden score may be calculated for each combination of CPP and REPP. For example, a burden score may be calculated for the first CPP 240 to supply power to the first REPP 208, for the first CPP to supply power to the third REPP 210, for the second CPP 241 to supply power to the first REPP 208, and so on. The differences in burden scores may represent the transmission losses and other factors associates with transmitting power from each CPP to each REPP. For example, a CPP that is farther away from a REPP than another CPP is to the REPP may have a higher burden score due to transmission losses.

At operation 910 of the method 900, the processing circuit determines the configuration of power delivery from the CNPP to the subset of REPPs. For example, as shown in further detail in FIG. 10, if the CNPP or an individual CPP of the CNPP can deliver station power to more than one REPP, the CNPP or the CPP may deliver power to the REPP having a higher need score first. If more than one CPP can deliver station power to a REPP, the CPP with the lower burden score will deliver power to the REPP first. Power may be allocated according to the burden scores of the CPPs and the need scores of the REPPs until a termination condition is met. One termination condition may be that all of the available power from the CNPP has been allocated. In this case, power from the CNPP will be allocated to the REPPs with the highest need scores, while REPPs with lower need scores may not receive all or any of the power requested. Another termination condition may be that all station power needs of the REPPs have been met by the CNPP. This case, power may be allocated to the REPPs from the CPPs having the lowest burden scores, while some or all of the available power from CPPs having higher burden scores may not be allocated to a REPP. In some embodiments, a third termination condition may be based on a comparison of a need score of a REPP and a burden score of a CPP. For example, if the opportunity cost of the CNPP supplying station power exceeds the opportunity cost of a REPP not receiving station power, power from CNPP may not be allocated to the REPP, even if the CNPP is producing sufficient power to meet the station power needs of the REPP. The burden scores and need scores may be scaled such that an accurate comparison of the opportunity costs and other factors affecting the scores may be made.

In the example 1000, the supervisory controller 204 (e.g., the available power determination module 226) determines that station power needs of both REPP 208 and REPP 210 should be fully met by the CNPP 244. The supervisor controller 204 may then use the burden scores of the CPPs 240-242 to determine the order in which the CPPs 240-242 should allocate power to the REPPs 208, 210. Because the CPP 241 has the lowest burden score, power may first be allocated from the CPP 241 to the REPP with the highest need score, REPP 208. If CPP 241 can supply more power than is requested by the REPP 208, the remaining power from CPP 241 may then be allocated to the REPP 210. If CPP 241 cannot supply sufficient power to meet the power request of the REPP 208, power from the CPP with the next lowest burden score, CPP 240, may be allocated to the REPP 208. Any remaining power from the CPP 240 may be allocated to the REPP 210. If CPP 240 and CPP 241 cannot supply sufficient power to meet the power requests of the REPP 208 and the REPP 210, power from the CPP 242 may be allocated to the REPP 210. Thus, if it is determined that the CNPP produces enough power to supply the station power for all REPPs not precluded by wheeling constraints, power is allocated from the CPPs with the lowest burden scores first. If it is determined that a CPP does not produce a power to supply station power or all REPPs not precluded by wheeling constraints, powers allocated to the REPPs with the highest need scores first. As discussed above, the allocation of power may be affected by the relative burden scores of the CPPs compared to the relative need scores of the REPPs. For example, if the CPP 240 and the CPP 241 combined produce sufficient power to supply the station power needs of REPP 208 but not enough power to supply the station power needs of both REPP 208 and REPP 210, a comparison of the burden score of the CPP 242 to the need score of the REPP 210 may be performed. The burden score and/or the need score may be scaled such that an accurate comparison can be made. If, after scaling, the burden score of the CPP 242 exceeds the need score for the REPP 210, power may not be allocated from the CPP 242 to the REPP 210.

In the example 1000, it is determined that the CNPP 244 can produce enough power supply all of the station power needs of REPP 208 and REPP 210. It is further determined that no burden scores of the CPPs 240-242 outweigh the need score of the REPPs 208, 210. Therefore, power allocation from the CPPs 240-242 to the REPPs 208, 210 will not be restricted. Power will be allocated from the CPPs 240-242 based on their respective burden scores. Thus, power will first be allocated from the 241, then, if necessary, from the CPP 240, then it necessary from the CPP 242. The method 900 ensures that power is being allocated to the REPPs with the highest need from the CPP is with the lowest burden whenever possible, maximizing the efficiency of the system. The method 900 further prevents the CNPP 244 from allocating power to a REPP when doing so would burden the CNPP more than it would benefit the REPP.

In some embodiments, the processing circuit may consider other factors in determining whether the CNPP will provide power to requesting power plant. For example, if requests for power from the CNPP and are received from multiple power plants, the processing circuit may prioritize providing power to REPPs over nonrenewable power plants or may exclude nonrenewable power plants altogether for a specified time period. As another example, the processing circuit may prioritize or exclude power plants in certain geographical locations or may prioritize or exclude certain types of REPPs over others (e.g., prioritizing wind plants over solar plants, prioritizing plants without energy storage systems, etc.). In some embodiments, plants may be prioritized or excluded based on expected weather conditions. For example, a solar plant with an energy storage system may be excluded from receiving power from the CNPP if it is determined that the energy storage system has sufficient stored energy to supply the station power until sunny weather is expected. In some embodiments, these factors may be considered in determining the need score. In some embodiments, these factors may cause a power plant to be entirely excluded from consideration for receiving power from the CNPP, similar to those power plants excluded or precluded due to wheeling constraints.

At operation 912 of the method 900, a notification is provided to the operator of each REPP to which the CNPP will provide power indicating the amount of power that will be supplied based on the power delivery configuration. In the example 1000, though not shown, supervisory controller 204 (e.g., the notification generation module 234) may generate and send a notification to the first REPP 208 (e.g., the operator of the REPP 208) indicating the amount of power that will be supplied to the first REPP 208 by the CNPP 244 and may generate and send a notification to the third REPP 210 (e.g., the operator of the third REPP 210) indicating the amount of power that will be supplied to the first REPP 208 by the CNPP 244. In some embodiments, a notification may be provided to the operator of each REPP to which the CPP is unable to provide power due to wheeling constraints or which will not receive power due to a relatively low need score.

At operation 914 of the method 900, a notification is provided to the operator of each CPP that will provide power indicating the amount of power that will be supplied based on the power delivery configuration. In the example 1000, though not shown, supervisory controller 204 (e.g., the notification generation module 234) may generate and send a notification to the first CPP 240 (e.g., the operator of the first CPP 240) indicating the amount of power that will be supplied by the first CPP 240, may generate and send a notification to the second CPP 241 (e.g., the operator of the second CPP 241) indicating the amount of power that will be supplied to the by the second CPP 241, may generate and send a notification to the third CPP 242 (e.g., the operator of the third CPP 242) indicating the amount of power that will be supplied to the by the third CPP 242. In some embodiments, a notification may be provided to the operator of each CPP that is not required to supply power.

At operation 916 of the method 900, the processing circuit supplies power from the CNPP to the one or more of the REPPs according to the power supply determination of operation 608. For example, the processing circuit may control equipment of the CNPP (or CPPs) that operates to control the flow of electricity from the CNPP or may send instructions to a controller of the CNPP (or CPPs) to control the flow of electricity from the CNPP to the grid. The processing circuit may also control equipment on the grid or may send instructions to the grid causing power to flow from the CNPP to the requesting REPP or requesting that power be delivered from the CNPP to the requesting REPP. The processing circuit may also control equipment of the requesting REPP or send instructions to a controller of the requesting REPP causing the requesting REPP to receive power generated by the CNPP via the grid. In example 1000, supervisory controller 204 (e.g., the power flow control module 222) causes power to be supplied from the CNPP 244 (e.g., the CPPs 240-242) to the first REPP 208 and the third REPP 210 via the grid 206. For example, the supervisory controller 204 may send an instruction to each CPP 240-242 to supply power to the grid 206, may send an instruction to the grid 206 to deliver the power to the first REPP 208 and the third REPP 210, and may send an instruction to the first REPP 208 and the third REPP 210 to receive the power from the grid 206.

At operation 918 of the method 900, the processing circuit receives a measurement from a meter associated with a CPP or a REPP indicating the amount of power that is supplied to the requesting REPPs via the grid. At operation 920 of the method, the processing circuit provides a notification to the operator of the CPP or the operator of the REPP indicating the amount of power supplied by the CPP or received by the REPP. In the example 1000, though not shown, supervisory controller 204 (e.g., the power flow measurement module 232) may receive a measurement from a meter associated with the CPP 240 indicating the amount of power supplied to the first REPP 208 and the third REPP 210. Then, the supervisory controller 204 (e.g., the notification generation module 234) may send a notification to the operator of the CPP 240 indicating the amount of power supplied.

It should be understood that power supplied to a requesting power plant from a provider power plant, a CPP, or a CNPP via the grid may be "mixed" with power from other sources sharing the grid transmission lines. However, by allocating the power to the requesting power plant, the power provided by the provider power plant, CPP, or CNPP and received by the requesting power plant can be monitored and can reduce the power assumed to be supplied by other sources on the grid. Monitoring of power supplied and received may take into account transmission losses on the grid. Thus, a supplier power plant may supply a first amount of power to the grid, and a requesting power plant may receive the first amount of power (adjusted for transmission losses), and it may be assumed that the supplier power plant has supplied the first amount of power plant to the requesting power plant.

In an aspect, a non-transitory computer readable storage medium in an energy control system is provided. The medium includes instructions stored thereon that, upon execution by a processor, cause the processor to receive a request for station power from a requesting power plant of a plurality of power plants, determine a burden score associated with supplying the station power to the requesting power plant from two or more supplier power plants of the plurality of power plants, allocate available power from the supplier power plant having the lowest burden score to the requesting power plant, and provide a notification to an operator of the supplier power plant having the lowest burden score. The notification indicates the amount of power expected to be supplied to the requesting power plant.

In some embodiments, the instructions, when executed by the processor, further cause the processor to identify a subset of power plants not precluded by wheeling constraints from supplying the station power, wherein the two or more supplier power plants are within the sub set.

In some embodiments, the instructions, when executed by the processor, further cause the processor to identify a combination of one or more of the supplier power plants capable of producing sufficient available power to meet the request for station power.

In some embodiments, the instructions, when executed by the processor, further cause the processor to allocate all available power from a supplier power plant in the combination having the lowest burden score before allocating power from a supplier power plant having a higher burden score.

In some embodiments, the instructions, when executed by the processor, further cause the processor to provide a notification to each supplier power plant in the combination indicating the amount of power that will be supplied to the requesting power plant.

In some embodiments, the instructions, when executed by the processor, further cause the processor to receive a measurement from a meter associated with the supplier power plant having lowest burden score or the requesting power plant. The measurement indicates the amount of power used to serve the request of the requesting power plant. The instructions, when executed by the processor, further cause the processor to provide a notification to the operator of the supplier power plant having lowest burden score and/or to the operator of the requesting power plant indicating the measurement.

In some embodiments, the instructions, when executed by the processor, further cause the processor to supply power from the supplier power plant having the lowest burden score to the requesting power plant.

In some embodiments, the burden scores are calculated based on at least one of operational disruption to the supplier power plant expected from supplying station power to the requesting power plant, power transmission losses expected from transmitting power from the supplier power plant to the requesting power plant, or other efficiency losses expected from supplying station power to the requesting power plant.

In another aspect, a method is provided. The method may include receiving a request for station power from two or more requesting power plants, determining a need score for each requesting power plant, allocating available power from a supplier power plant to the requesting power plants based on the need scores, and providing a notification to an operator of at least one of the requesting power plants. The notification indicates the amount of power expected to be received from the supplier power plant.

In some embodiments, the method includes identifying a subset of the requesting power plants not precluded by wheeling constraints from receiving power from the supplier power plant, wherein allocating the available power comprises allocating power only to power plants within the subset.

In some embodiments, allocating the available power comprises first allocating available power to a requesting power plant with the highest need score, and then allocating any remaining available power to requesting power plants with lower need scores.

In some embodiments, providing a notification to at least one of the requesting power plants comprises providing a notification to each requesting power plant to which the available power is allocated.

In some embodiments, the method includes identifying a subset of the requesting power plants within a qualifying category of power plants. The qualifying category includes one of wind energy power plants, solar energy power plants, renewable energy power plants, energy storage power plants, power plants within a defined geographical region, or power plants expected to experience defined weather conditions. In these embodiments, allocating the available power comprises allocating power only to power plants within the subset.

In some embodiments, the method further includes receiving a measurement from a meter associated with a first requesting power plant to which power is allocated and providing a notification to an operator of the supplier power plant and/or to an operator of the first requesting power plant indicating the measurement.

In some embodiments, the need scores are calculated based on at least one of operational disruption to the requesting power plant expected if station power is not provided, efficiency losses expected from receiving station power from an alternate source, or other efficiency losses expected from a temporary loss of station power.

In another aspect, a system is provided. The system includes a first plurality of power plants, a plurality of supplier power plants connected to the first plurality of power plants by a grid, and a controller including a processor and a non-transitory computer readable storage medium. The medium includes instructions stored thereon that, upon execution by the processor, cause the controller to receive a request for station power from two or more requesting power plants of the first plurality of power plants determine a need score for each requesting power plant, determine a burden score associated with supplying the station power to the requesting power plants from two or more of the supplier power plants, determine a configuration of power delivery from at least one supplier power plant to at least one requesting power plant based on the need scores and the burden scores, and provide a notification to at least one of the requesting power plants. The notification indicates the amount of power expected to be received from the at least one supplier power plant.

In some embodiments, the notification indicates an amount of power expected to be received from each supplier power plant.

In some embodiments, determining the configuration of power delivery includes allocating available power to the requesting power plants from a supplier power plant with the lowest burden score before allocating power from supplier power plants with higher burden scores and allocating available power from the supplier power plants to a requesting power plant with the highest need score first before allocating power to requesting power plants with lower need scores.

In some embodiments, power is allocated until a termination condition is met. The termination condition includes one of (a) allocating all of the available power from the supplier power plants; (b) allocating sufficient power from the supplier power plants to meet the request for station power from all of the requesting power plants; or (c) allocating available power until the lowest burden score of the supplier power plants having unallocated power exceeds a highest scaled need score of the requesting power plants having station power needs which have not been met by allocated power.

In some embodiments, the burden scores are calculated based on at least one of operational disruption to the supplier power plant expected from supplying station power to the requesting power plant, power transmission losses expected from transmitting power from the supplier power plant to the requesting power plant, or other efficiency losses expected from supplying station power to the requesting power plant, and the need scores are calculated based on at least one of operational disruption to the requesting power plant expected if station power is not provided, efficiency losses expected from receiving station power from an alternate source, or other efficiency losses expected from a temporary loss of station power.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some implementations, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above-described embodiments, methods, and examples, but by all embodiments and methods within the scope and spirit of the disclosure.

What is claimed is:

1. A non-transitory computer readable storage medium of a controller in an energy control system, the medium comprising instructions stored thereon that, upon execution by a processor of the controller, cause the processor to:
   receive a request for station power from a requesting power plant of a plurality of power plants;
   determine a burden score associated with supplying the station power to the requesting power plant from two or more supplier power plants of the plurality of power plants, the burden score determined based on an opportunity cost associated with supplying power from the requesting power plant;
   allocate available power from the supplier power plant having the lowest burden score to the requesting power plant; and
   send a control signal to the supplier power plant having the lowest burden score indicating the amount of power expected to be supplied to the requesting power plant, wherein the supplier power plant supplies the requesting power plant with the amount of power based on the control signal.

2. The medium of claim 1, wherein the instructions, when executed by the processor, further cause the processor to identify a subset of power plants not precluded by wheeling constraints from supplying the station power, wherein the two or more supplier power plants are within the subset.

3. The medium of claim 1, wherein the instructions, when executed by the processor, further cause the processor to identify a combination of one or more of the supplier power plants capable of producing sufficient available power to meet the request for station power.

4. The medium of claim 3, wherein the instructions, when executed by the processor, further cause the processor to allocate all available power from a supplier power plant in the combination having the lowest burden score before allocating power from a supplier power plant having a higher burden score.

5. The medium of claim 4, wherein the instructions, when executed by the processor, further cause the processor to provide a notification to each supplier power plant in the combination indicating the amount of power that will be supplied to the requesting power plant.

6. The medium of claim 1, wherein the instructions, when executed by the processor, further cause the processor to:
   receive a measurement from a meter associated with the supplier power plant having lowest burden score or the requesting power plant, the measurement indicating the amount of power used to serve the request of the requesting power plant; and
   provide a notification to the operator of the supplier power plant having lowest burden score and/or to the operator of the requesting power plant indicating the measurement.

7. The medium of claim 1, wherein the burden scores are calculated based on at least one of operational disruption to the supplier power plant expected from supplying station power to the requesting power plant, power transmission losses expected from transmitting power from the supplier power plant to the requesting power plant, or other efficiency losses expected from supplying station power to the requesting power plant.

8. A method comprising:
   receiving, at a controller, a request for station power from two or more requesting power plants;
   determining, at the controller, a need score for each requesting power plant, the need score determined based on an opportunity cost associated with supplying power from the requesting power plant;
   allocating, by the controller, available power from a supplier power plant to the requesting power plants based on the need scores; and
   sending, from the controller, a control signal to the supplier power plant indicating the amount of power expected to be supplied to at least one requesting power plant, wherein the supplier power plant supplies the at least one requesting power plant with the amount of power based on the control signal.

9. The method of claim 8, further comprising identifying a subset of the requesting power plants not precluded by wheeling constraints from receiving power from the supplier power plant, wherein allocating the available power comprises allocating power only to power plants within the subset.

10. The method of claim 8, wherein allocating the available power comprises first allocating available power to a requesting power plant with the highest need score, and then allocating any remaining available power to requesting power plants with lower need scores.

11. The method of claim 10, wherein providing a notification to at least one of the requesting power plants comprises providing a notification to each requesting power plant to which the available power is allocated.

12. The method of claim 8, further comprising identifying a subset of the requesting power plants within a qualifying category of power plants, the qualifying category comprising one of: wind energy power plants, solar energy power plants, renewable energy power plants, energy storage power plants, power plants within a defined geographical region, or power plants expected to experience defined weather conditions; wherein allocating the available power comprises allocating power only to power plants within the subset.

13. The method of claim 8, further comprising:
receiving a measurement from a meter associated with a first requesting power plant to which power is allocated; and
providing a notification to an operator of the supplier power plant and/or to an operator of the first requesting power plant indicating the measurement.

14. The method of claim 8, wherein the need scores are calculated based on at least one of operational disruption to the requesting power plant expected if station power is not provided, efficiency losses expected from receiving station power from an alternate source, or other efficiency losses expected from a temporary loss of station power.

15. A system comprising:
a first plurality of power plants;
a plurality of supplier power plants connected to the first plurality of power plants by a grid;
and a controller including a processor and a non-transitory computer readable storage medium comprising instructions stored thereon that, upon execution by the processor, cause the controller to:
receive a request for station power from two or more requesting power plants of the first plurality of power plants;
determine a need score for each requesting power plant;
determine a burden score associated with supplying the station power to the requesting power plants from two or more of the supplier power plant, the burden score determined based on an opportunity cost associated with supplying power from the requesting power;
determine a configuration of power delivery from at least one supplier power plant to at least one requesting power plant based on the need scores and the burden scores; and
send at least one control signal to at least one supplier power plant indicating the amount of power expected to be supplied to the at least one requesting power plant, wherein the at least one supplier power plant supplies the at least one requesting power plant with the amount of power based on the at least one control signal.

16. The system of claim 15, wherein the notification indicates an amount of power expected to be received from each supplier power plant.

17. The system of claim 15, wherein determining the configuration of power delivery comprises:
allocating available power to the requesting power plants from a supplier power plant with the lowest burden score before allocating power from supplier power plants with higher burden scores; and
allocating available power from the supplier power plants to a requesting power plant with the highest need score first before allocating power to requesting power plants with lower need scores.

18. The system of claim 17, wherein power is allocated until a termination condition is met, the termination condition comprising one of:
(a) allocating all of the available power from the supplier power plants;
(b) allocating sufficient power from the supplier power plants to meet the request for station power from all of the requesting power plants; or
(c) allocating available power until the lowest burden score of the supplier power plants having unallocated power exceeds a highest scaled need score of the requesting power plants having station power needs which have not been met by allocated power.

19. The system of claim 15, wherein:
the burden scores are calculated based on at least one of operational disruption to the supplier power plant expected from supplying station power to the requesting power plant, power transmission losses expected from transmitting power from the supplier power plant to the requesting power plant, or other efficiency losses expected from supplying station power to the requesting power plant; and
wherein the need scores are calculated based on at least one of operational disruption to the requesting power plant expected if station power is not provided, efficiency losses expected from receiving station power from an alternate source, or other efficiency losses expected from a temporary loss of station power.

* * * * *

UNITED STATES PATENT AND TRADEMARK OFFICE
CERTIFICATE OF CORRECTION

| | | |
|---|---|---|
| PATENT NO. | : 11,804,719 B1 | Page 1 of 1 |
| APPLICATION NO. | : 18/126716 | |
| DATED | : October 31, 2023 | |
| INVENTOR(S) | : Nadim Kanan and Zeljko Gigio Sakota | |

It is certified that error appears in the above-identified patent and that said Letters Patent is hereby corrected as shown below:

In the Claims

Column 25, Line 41, in Claim 1, please delete "from" and insert --to.--

Column 26, Line 32, in Claim 8, please delete "from" and insert --to.--

Column 27, Line 30, in Claim 15, please delete "from" and insert --to.--

Signed and Sealed this
Twenty-eighth Day of November, 2023

*Katherine Kelly Vidal*

Katherine Kelly Vidal
*Director of the United States Patent and Trademark Office*